United States Patent
McDowell et al.

(10) Patent No.: US 6,438,583 B1
(45) Date of Patent: Aug. 20, 2002

(54) SYSTEM AND METHOD FOR RE-ROUTING OF E-MAIL MESSAGES

(75) Inventors: Mark E. McDowell, Springfield; Joseph G. Khalil, Alexandria; Graham D. Stead, Arlington, all of VA (US)

(73) Assignee: Re-Route Corporation, Alexandria, VA (US)

( * ) Notice: Subject to any disclaimer, the term of this patent is extended or adjusted under 35 U.S.C. 154(b) by 0 days.

(21) Appl. No.: 09/338,734

(22) Filed: Jun. 23, 1999

(51) Int. Cl.$^7$ ............................................... G06F 15/16
(52) U.S. Cl. ............................ 709/206; 709/207; 705/1
(58) Field of Search ................................ 709/206, 207; 705/1

(56) References Cited

U.S. PATENT DOCUMENTS

| | | | |
|---|---|---|---|
| 5,109,519 A | 4/1992 | Zimmet et al. | 395/800 |
| 5,483,466 A | 1/1996 | Kawahara et al. | 364/514 |
| 5,493,692 A | 2/1996 | Theimer et al. | 455/26.1 |
| 5,596,720 A | 1/1997 | Hamada et al. | 395/200.03 |
| 5,619,648 A | 4/1997 | Canale et al. | 395/200.01 |
| 5,710,924 A | 1/1998 | Ayoub et al. | 395/683 |
| 5,751,960 A | 5/1998 | Matsunaga | 395/200.36 |
| 5,761,415 A | 6/1998 | Joseph et al. | 395/200.3 |
| 5,765,033 A | 6/1998 | Miloslavsky | 395/200.36 |
| 5,790,649 A | 8/1998 | Hiroshige | 379/201 |
| 5,790,793 A | 8/1998 | Higley | 395/200.48 |
| 5,796,394 A | 8/1998 | Wicks et al. | 345/329 |
| 5,812,795 A | 9/1998 | Horovitz | 395/200.75 |
| 5,822,526 A | 10/1998 | Waskiewicz | 395/200.36 |
| 5,844,969 A | 12/1998 | Goldman et al. | 379/93.24 |
| 5,878,230 A | 3/1999 | Weber et al. | 395/200.68 |
| 5,889,518 A | 3/1999 | Poreh et al. | 345/340 |
| 5,889,845 A | 3/1999 | Staples et al. | 379/211 |
| 5,905,777 A | 5/1999 | Foladare et al. | 379/90.01 |
| 5,937,161 A | * 8/1999 | Mulligan et al. | 709/206 |

FOREIGN PATENT DOCUMENTS

| | | |
|---|---|---|
| WO | 97/39532 | 10/1997 |
| WO | 98/00787 | 1/1998 |
| WO | 99/17241 | 4/1999 |
| WO | 99/17505 | 4/1999 |

OTHER PUBLICATIONS

"How do I forward my mail?" Feb. 20, 1998. Computing Services Newsletter www.mrs.umn.edu/cs/newsletters/winter98/mail.shtml, p. 1–3.*
www.returnpath.net, Copyright 2000–2002.*
Pobiner, Heather, "Don't get e–lost", 1999–2000. http://www.newu.uci.edu/archive/1999–2000/fall/991025/f–991025–elost.html pp. 1–2.*
www.re–route.com, Copyright 2000–2002.*
Electricmail Press Release, "Electricmail Launches New Internet Messaging Service: Emmis Mail Give Corporates Unprecedented Levels Of Service, Reliability And Flexibility", Mar. 1997 pp. 1–4.

(List continued on next page.)

*Primary Examiner*—Dung C. Dinh
*Assistant Examiner*—Kimberly Flynn
(74) *Attorney, Agent, or Firm*—Roberts, Abokhair & Mardula, LLC

(57) ABSTRACT

A method and apparatus for the re-routing of e-mail sent to a prior address (or an address that is non-working, or temporarily inconvenient) to the new address of an intended recipient. E-mail that is to be sent to a recipient is sent to the former Internet Service Provider (ISP). Because the recipient is no longer a subscriber to the old ISP, or because the address at the old ISP is temporarily inconvenient, the e-mail is re-routed to a re-route server of the present invention. The re-route server then causes the e-mail to be sent to the correct address through a variety of processes. Alternatively, new e-mail addresses are made available at the old ISP. The old ISP can then forward e-mail messages directly to the new ISP.

8 Claims, 30 Drawing Sheets

OTHER PUBLICATIONS

Emailflow For Exchange, "Mail essentails for Exchange / SMTP Pre Sales FAQ", Feb. 1999, pp. 1–3.

ActiveNames™ The World's Free E–Mail Tracker™ Dec. 1999 http://www.activenames.com.

* cited by examiner

SYSTEM AND METHOD FOR RE-ROUTING OF E-MAIL MESSAGES

BACKGROUND OF THE INVENTION

The present invention is directed to a method and apparatus for redirecting network traffic. More particularly, the present invention is directed to a method and apparatus of re-routing electronic mail (or "e-mail") messages transmitted via the Internet.

BACKGROUND ART

One of the most basic services offered by Internet Service Providers (or "ISPs") is a private or corporate e-mail account that a customer may use for transmitting and receiving electronic mail (e-mail) messages via the Internet. Each of these e-mail accounts has a unique address.

Internet service customers are notoriously fickle in their choice of ISPs. The customer turnover rate is typically 50% each year for most ISPs (those ISPs that do not have meaningful market competition have lower turnover, of course). When a customer closes an account at one ISP and opens a new account at another ISP, the customer cannot maintain the same e-mail address. This is a natural result of the currently used e-mail addressing convention wherein part of the address includes an identification of the ISP. Thus, when the ISP changes, at least a part of the e-mail address must also change.

This is inconvenient because e-mail gets lost. In the prior art, e-mail messages sent to a defunct address (belonging to an inactive account) are either acknowledged as being undeliverable or they are simply ignored. Colloquially, acknowledgement by an ISP that the message is undeliverable as addressed is known as "bouncing" the message back to the sender. Although this doesn't get the message to the intended recipient and it fails to inform the sender of a correct address (if any exists) for the intended recipient, at least it puts the sender on notice that they have attempted to use an inaccurate e-mail address.

Simply ignoring an undeliverable message, as is done by some ISPs, is quite non-helpful because the sender remains ignorant that the message was sent to an inaccurate address.

SUMMARY OF THE INVENTION

The present invention is a method and apparatus for the rerouting of e-mail from a prior or non-working address to the new address of a recipient. In general, two basic re-route methods are employed, varying as noted more fully below. E-mail that is to be sent to a recipient is sent to the former Internet Service Provider (ISP). Since the recipient is no longer a subscriber to the old ISP, the e-mail is re-routed to a re-route server of the present invention. The re-route server then causes the e-mail to be sent to the correct address through a variety of means. This embodiment provides privacy with respect to the new address of the recipient since it is known only to the re-route server and NOT to the old ISP.

Alternatively, new e-mail addresses are made available at the old ISP. The old ISP can then forward e-mail directly to the new ISP. This has the advantage of a direct route from the old ISP to the new ISP. However, privacy of the new e-mail address for the recipient is less since the address is now known to the old ISP.

In ether case, a business model arises that allows this process to occur. As noted above, there is a tremendous turnover in subscribers to any particular ISP. Realizing that, just as e-mail may be forwarded AWAY from an ISP, so can e-mail to other ISP's be forwarded TO the old ISP for new subscribers. Thus it is to all ISP's advantage to forward e-mail where possible. In addition, user fees will be paid for this service. Those entities running re-route servers could easily share revenue with the ISP's that are registered with the re-route service. Thus not only will a valuable service be performed, but the ISP's can generate additional revenues from participation.

DETAILED DESCRIPTION OF THE INVENTION

Figure 1:
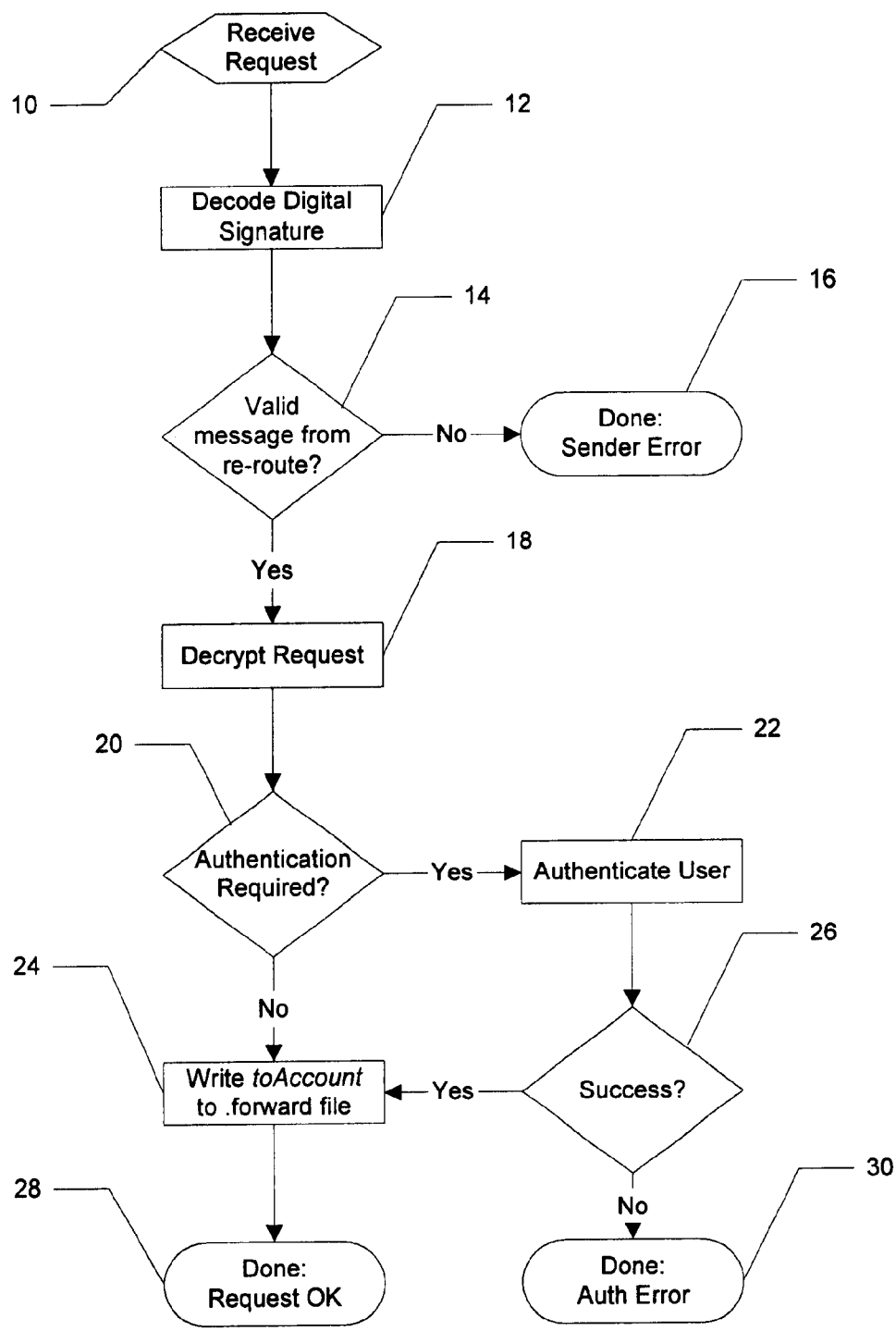
FIG. 1 illustrates the request handler for the ".forward" implementation of the present invention.

In the following description, the different embodiments of the invention are explained from the point of view of analyzing how e-mail sent to a single invalid (or undesired) e-mail address is forwarded to a currently valid e-mail account. This is a simplification of the general case, and is done for ease of explanation. In the general case, an individual may have left behind a string of abandoned e-mail accounts that all need to be forwarded to their currently valid address. When the simplified case is extrapolated to the general case, any of the embodiments described below may be combined with one another to handle messages sent to different ones of the plural abandoned e-mail accounts.

Also for clarity of explanation, the convention is adopted that the ISP that is forwarding e-mails is called the "old ISP" and the ISP that hosts the currently valid account is called the "new ISP." The account for which the e-mail address is no longer current is called the "FROM account" and the current account, to which mail needs to be forwarded, is called the "TO account." By choice of this convention, the term "old ISP" is not meant to limit the disclosure to situations where an email account has been permanently terminated or abandoned at that ISP. Rather, the term "old ISP" is intended to encompass situations wherein a user having plural current e-mail accounts wishes to have e-mail addressed to one of those accounts temporarily forwarded to another one of his or her accounts.

The .forward File Embodiment

According to one embodiment of the invention, e-mail is forwarded from the old ISP to the new ISP by means of a ".forward" file. The old ISP maintains the FROM account and inserts a .forward file that contains the TO account. As a result, all e-mail is still routed to the old ISP. The message passes through the old ISP's sendmail and the sendmail connects to the machine at the new ISP to deliver the message to the TO account (contained in the forward file) at the new ISP. This is implemented using UNIX.

This embodiment requires that the old ISP keep the FROM account open after the user has abandoned it.

The E-Mail Alias Embodiment

According to another embodiment of the invention, the old ISP aliases the FROM account to the TO account with an /etc/aliases entry. This uses a lookup table. All e-mail is still routed to the old ISP. The message passes through the old ISP's sendmail and the sendmail connects to a new machine. A consistent address, e.g., user@re-route.com, is used for all customers, although this specific format is not meant as a limitation. Other formats are possible for this alias embodiment. A customer who cancels their re-route service agreement will still have his/her e-mail sent to another consistent address, e.g., cheapskate@re-route.com. This procedure should be supported in all Internet systems, as explained in RFC (request for comment) 1123, which is incorporated by reference herein, in its entirety.

This embodiment permits the old ISP to close the FROM account after the user has abandoned it.

The Transfer of Mail Exchange Authority with Pass-Through Sendmail Embodiment

According to another embodiment of the invention, the ISPs give MX Authority to a Re-route Central Authority entity (e.g., re-route.com). All e-mail destined for ISPs that have signed up with re-route.com are first routed to re-route.com. For those customers who have informed re-route.com of a change of address, the e-mail is routed to the TO account. Otherwise, the e-mail messages pass through the re-route.com system to the ISP to which they are nominally addressed.

One result of this embodiment is that all e-mail for all ISPs that subscribe to this system would need to pass through servers for the Re-route Central Authority entity.

The Mail Exchange Routing Embodiment

According to another embodiment of the invention, a fundamental change is made to the way that e-mail is routed on the Internet. The change is that client name resolver libraries use the entirety of the addresses—both the user portion and the fully qualified domain name portion—for queries. Based on this change of address interpretation, Mail Exchange Re-route Directory (MXRRD) keys can be used by Domain Name Servers to hold entries for individuals' e-mail accounts.

There are two alternate sub-embodiments of this re-route arrangement. One is that the Re-route Central Authority can be the Mail Exchange Authority and distribute a master copy of a re-route mapping database. The other is that the ISPs maintain their respective Mail Exchange Authorities and rely on the Re-route Central Authority to trigger updates to the re-route mapping database.

Seize and Forward Embodiment

In the "seize and forward" embodiment of the present invention, the ISP retains all of the customer account information. However, for those customers that have left the ISP's service, all e-mail for such customers is stored at the ISP for a time. At regular intervals, the server of the present invention logs onto the server of the ISP and seizes all of the e-mail that is being stored for those accounts that are no longer active at the ISP. This "seized" or downloaded e-mail is sorted by the present invention and for those accounts that have registered with the re-route server, the e-mail is forwarded to the new account at the new ISP.

Simple Mail Transfer Protocol (SMTP) Wrapper Embodiment

The SMTP wrapper embodiment may be implemented via software or via hardware. In the software implementation, the SMTP wrapper is a software wrapper around an ISP's message transport system such as "sendmail," program that determines how that wrapped code is to be executed. In the hardware implementation, the SMTP wrapper is a device disposed, preferably, between an ISP and the Internet, to intercept e-mail messages. Thus, the SMTP wrapper determines how the sendmail transport program of the ISP is to operate. In this case, the wrapper passes through e-mails that are bound for those individuals who formerly had an account at the ISP. E-mails that are passed through the ISP are sent to the server of the present invention for forwarding to the individual at the new ISP.

Bounced Mail Embodiment

The bounced mail embodiment of the present invention allows those ISP's that "bounce" mail, that is, return mail to a sender when the party to whom it is addressed is no longer available for any reason, to bounce the mail instead to the re-route server of the present invention. In this embodiment, any mail that cannot be delivered by an ISP is bounced to, for example, bounced@re-route.com. The re-route server then reviews the bounced mail to determine if it is for a person or entity that is a registered re-route user. If so, the mail is forwarded to the new address on file at the re-route server.

IPv6 Embodiment

A pressing problem that now exists is the potential for shortages of Internet addresses. The most viable candidate to replace the current Internet Protocol is Internet Protocol Version 6 (IPv6). This protocol allows a huge number of new IP unique addresses to be possible together with new routing schemes. DNS can resolve fully qualified domain names into IP addresses. Assuming that everyone will be able to have a unique IPv6 address in the future, traffic can be re-routed to individuals based on their respective IPv6 addresses.

OSI X.500 Embodiment

The Open Systems Interconnect (OSI) model is a model of network architecture and a suite of protocols to implement it developed by ISO as a framework for international standards in heterogeneous computer network architecture. X.500 (the set of ITU-T standards covering electronic directory services, such as white pages, Knowbot, and whois.) can support alternate addresses for individuals/recipients of e-mail. Such an X.500 system connected to the Internet e-mail system could re-route e-mail to the alternate addresses once they have been so designated by a user. In this instance the X.500 system receives e-mail at fromAccount. If the user has a toAccount entry, the mail is re-routed.

"Forwarding" Symbol in Local-Part Embodiment

Internet Standard RFC-822 defines the Internet standard format for electronic mail message headers. By using the "local part" of the mail message header, e-mail can be forwarded. For example, the address @gstead@mlj.com contains a symbol "@" before the name to designate a forwarding symbol. Alternatively a new symbol such as "rr!" might be designated as the universal re-route symbol for e-mail. While this does not designate a specific address, it does indicate to any server that the mail is to be re-routed if possible. Then certain of the other methods for re-route described herein can be used such as forwarding mail to the re-route server. In this instance, the sendmail systems must be programmed to recognize and treat a universal symbol as meaning re-route.

Re-route Extensions Embodiment

The re-route extension embodiment allows users to simply append the extension ".re-route.com" to an e-mail address (e.g., user@oldisp.com.re-route.com). This will provide automatic re-routing of e-mail if a recipient has so registered. If no re-route information has been provided, the e-mail is simply passed through to the original address. In this case the re-route server becomes the MX authority for re-route.com e-mail, thus all e-mail having the extension is re-routed to the re-route server to be reviewed.

LDAP Embodiment

The Lightweight Directory Access Protocol (LDAP) is a protocol for accessing on-line directory services. The e-mail client can download the fromAccount, toAccount list directly into e-mail client software for addressing e-mail. Thus, changing addressing from one account another, by acquiring the correct e-mail address, can be done at the client computer. Routing of the e-mail to the correct address can then be accomplished.

SMTP Return Codes

It is possible for SMTP implementation to verify that e-mail addresses are deliverable during the sending process. If a given e-mail is not deliverable to a first, old address, the e-mail can be delivered to a second host, assuming that the appropriate address at the new second host is known. This forwarding is done directly by the old ISP, which forwards the message either to a re-route server (and then, indirectly, on to the user's new address) or directly to the user's new account at a new ISP. These direct and indirect methods are explained in further detail below.

Client E-mail Plugin

This embodiment takes advantage of the common practice of many ISPs to bounce undeliverable e-mails back to the sending computer. A software plugin or wrapper is provided at the sending computer, which handles e-mail messages that are bounced back to it. When an e-mail message is bounced back, the e-mail plugin prompts the user to ask them if they would like to attempt to re-route the bounced email using any of the methods described herein. This is done, for example via a graphical user interface having a "re-route" button that the user may click on. In the event the user chooses to click the re-route button, thereby choosing to attempt a rerouting of the e-mail message, the e-mail message is then resent, this time addressed to the re-route server. The re-route server then forwards the message on to the correct current e-mail address for the intended recipient, assuming that the intended recipient's new e-mail address is registered with the re-route server.

As noted above, the present invention comprises a method and apparatus for rerouting e-mail destined for a person or entity formerly located at a given ISP and forwarding that e-mail to the new e-mail address for the recipient who may be located at a subsequent ISP. Referring to FIG. 1, the request handler for the ".forward" implementation of the present invention is illustrated. The user who desires to have its e-mail redirected registers with the re-route server of the present invention. The re-route server sends a re-route request to the old ISP. The request is received at the old ISP 10, which is usually accompanied by a digital signature of the requesting party. The digital signature is decoded 12, and the request along with the digital signature is provided to a process for determining whether the re-route request message is a valid one 14. If the message is determined not to be valid, as in the case of an individual who is not a client or former client of the old ISP, for example, an error is noted and the process ends 16.

If the message is a valid one, the request to re-route the e-mail is decrypted 18 and a determination is made whether authentication is required 20. If authentication is required, the user is authenticated 22. If the authentication is successful 26, the address to which the user would like mail forwarded is written to a ".forward" file 24 in the storage of the old ISP. If the user can not be authenticated, the process is terminated and an authentication error is sent to the requesting party 30. On the other hand, once the new address is written to the forward file of the old ISP, the request process is completed 28, and the server simply waits for e-mail traffic addressed to the old address of the user.

Figure 1A:
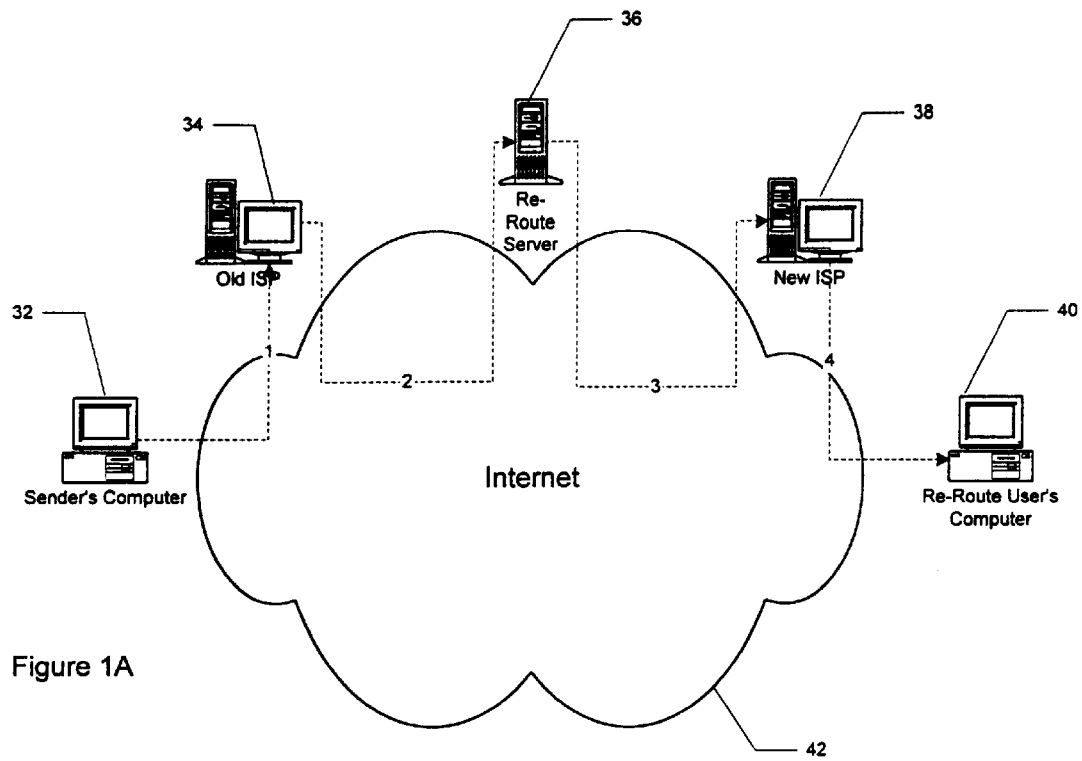
FIG. 1A illustrates the e-mail re-route path through the re-route server for the .forward implementation.

Referring to FIG. 1A, a first embodiment of the e-mail re-route path is illustrated. This figure illustrates the path of re-routed e-mail after an authenticated request is processed. Sender computer 32 sends e-mail to a recipient at the old ISP address 34 of the recipient. The old ISP 34 recognizes that the recipient is no longer subscribing to that ISP, and designates any mail for that recipient to be sent to the re-route server 36 based upon the forward file stored at the old ISP and designating the re-route server as the location in the .forward file. Old ISP 34 therefore forwards the recipient's e-mail over the Internet 42 to the re-route server 36. The old ISP 34 reviews the accounts of its subscribers and matches the incoming e-mail for the recipient to an address in its .forward file, which in this implementation is at the re-route server 36. Thereafter, the e-mail is re-addressed to the re-route server 36, which in turn associates that e-mail with the new address of the recipient at the new ISP. The re-route server 36 then forwards the e-mail to the new ISP 38 which stores the e-mail until downloaded by the recipient's computer 40. As noted above this implementation provides security for the new address of the recipient in that the address is known to the re-route server but not to the old ISP.

Figure 1B:
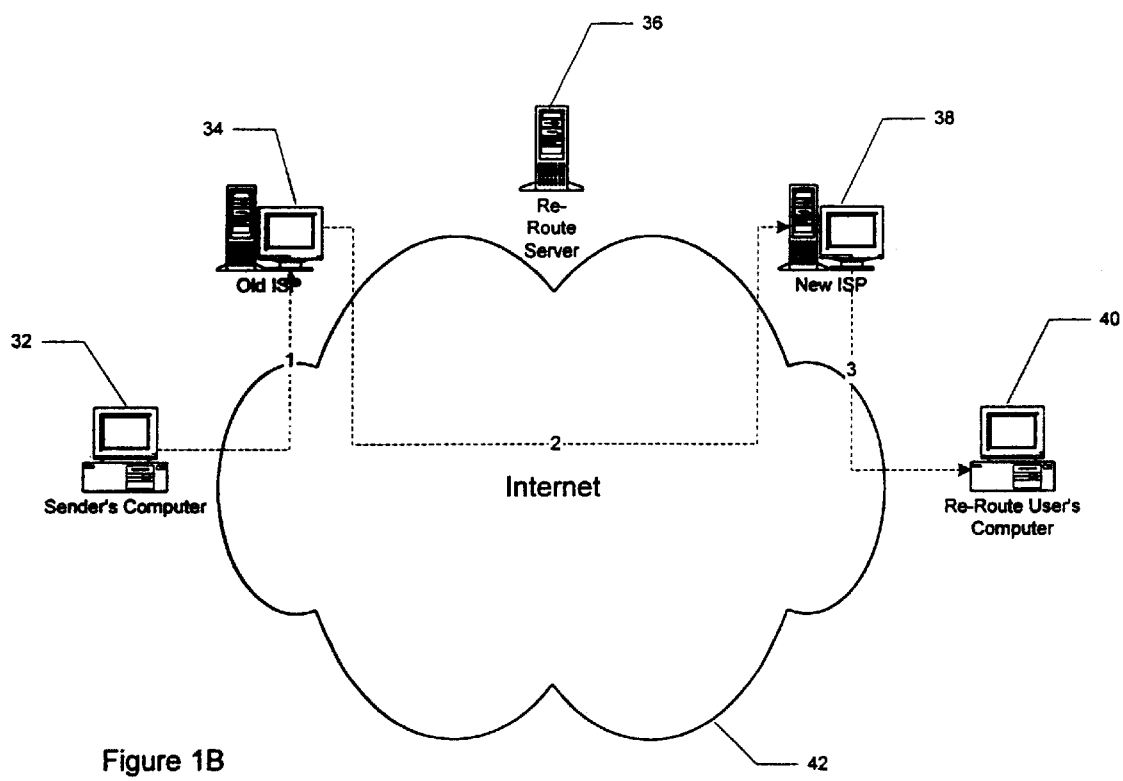
FIG. 1B illustrates the direct re-route path for the .forward implementation.

Referring to FIG. 1B, a direct e-mail re-route path of the present invention is illustrated. In this instance, re-route server 36 is notified by a user of the intent to re-route mail as described in FIG. 1 above. Re-route server provides a re-route request to the old ISP as described in FIG. 1. In this case however, that information to the old ISP comprises the new address of the recipient at the new ISP 38. Thereafter, a sender computer 32 sends an e-mail message to the prior address of the recipient at the old ISP 34. ISP 34 has been notified by the re-route server 36 of the new address of the recipient. The old ISP 34 then reviews its .forward files, finds the re-route request of the recipient, designates mail coming to the recipient's old address with the new ISP address. The message is then forwarded over the Internet 42 to the new ISP 38, which generally stores the e-mail until downloaded by the recipient 40.

Figure 2:
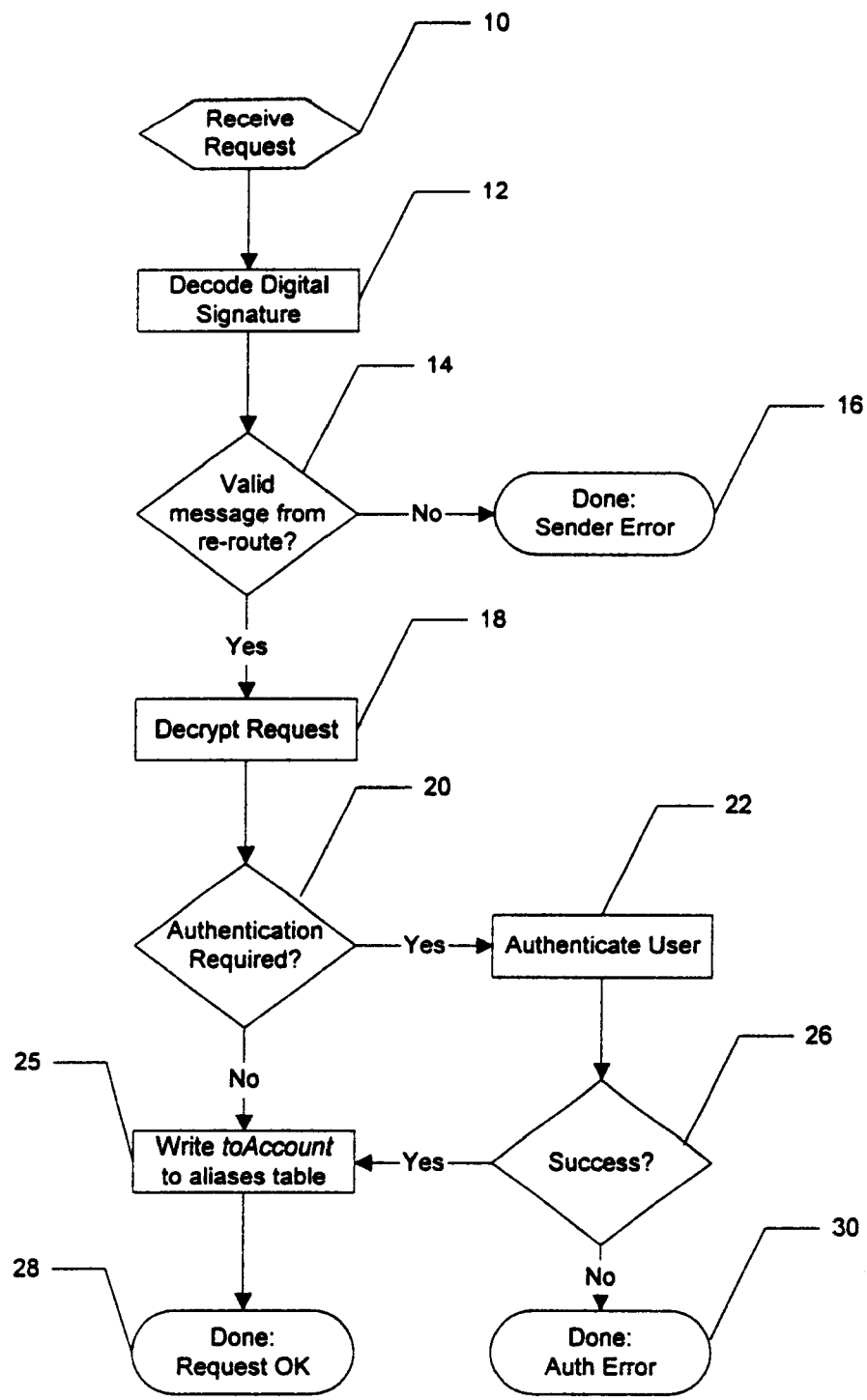
FIG. 2 illustrates the request handler for the alias table implementation of the present invention.

Referring to FIG. 2, the e-mail alias embodiment of the re-route request handler is illustrated. Again, a user registers with the re-route server of the present invention. The re-route server then sends a re-route request to the old ISP. This alternative embodiment re-route request handler functions in a similar fashion as described in FIG. 1 (above), except that when a decrypted request 18 is determined to either require authentication 20, thus resulting in an authenticated user 22 and the determination that the authentication was successful 26, or alternatively, authentication is not required, an alias table is created in the old ISP wherein the recipient's former Internet address is mapped to a new address in the table.

Figure 2A:
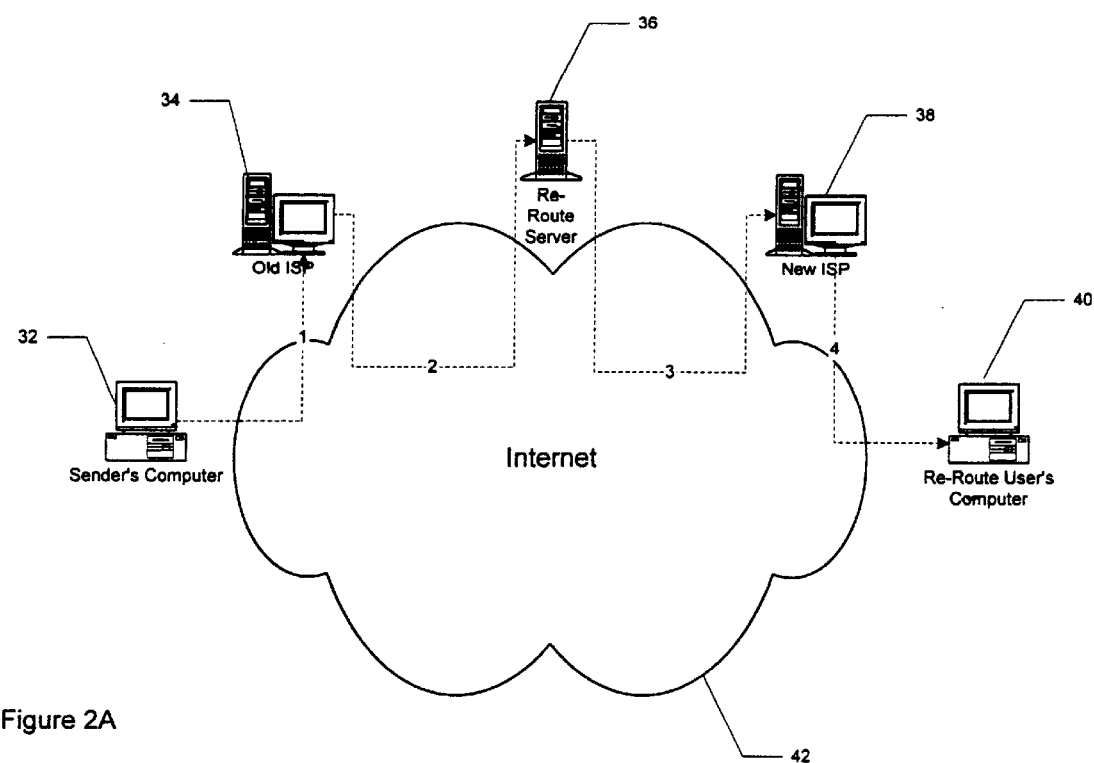
FIG. 2A illustrates the e-mail re-route path through the re-route server for the alias table implementation.

Referring to FIG. 2A, the e-mail re-route path of the alternative embodiment described in FIG. 2 is shown. In this instance the sender has registered with the re-route server 36 and the re-route server 36 has sent its re-route request to the old ISP naming the re-route server as the entity to be listed in the alias file of the old ISP for e-mail sent to the user. The sender's computer 32 sends an e-mail message addressed to the recipient's old e-mail address at the old ISP 34. The old ISP 34 recognizes that this is a message to be re-routed since there is a valid re-route request stored at the old ISP. The old ISP reviews its alias table and finds that the alias for the recipient is the address of the re-route server 36. The old ISP passes the message through its sendmail to the re-route server 36. The re-route server looks at its alias table for the recipient, and determines the recipient's new e-mail address. The mail is then forwarded via the Internet 42 to the new ISP 38, where it is stored until downloaded by the recipient's computer 40.

Figure 2B:
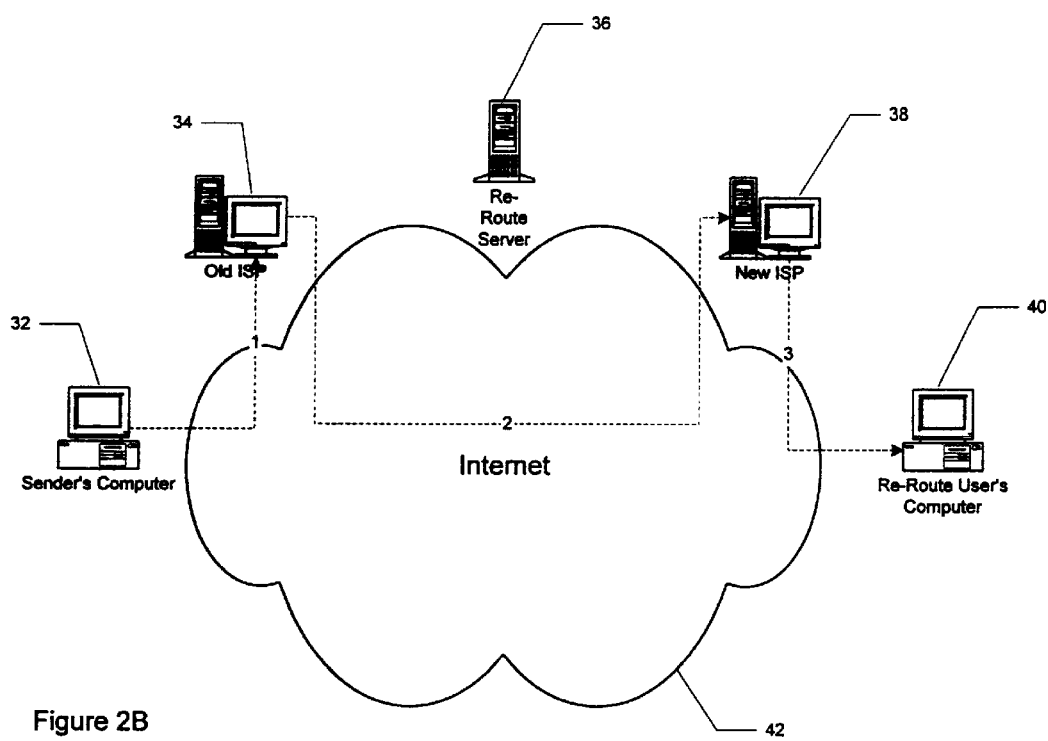
FIG. 2B illustrates the direct e-mail re-route path for the alias table implementation.

Referring to FIG. 2B, the direct e-mail re-route path of the e-mail alias embodiment shown in FIG. 2 is illustrated. In this instance, re-route server 36 provides the alias for the recipient to the old ISP 34. Thereafter, a sender's computer 32 sends an e-mail message to the recipient addressed to the old ISP 34. Old ISP 34 reviews its alias table to determine the new e-mail address of the recipient and re-addresses the mail directly to the new ISP 38, which in turn sends it on to the recipient 40 via the Internet 42.

Figure 3:
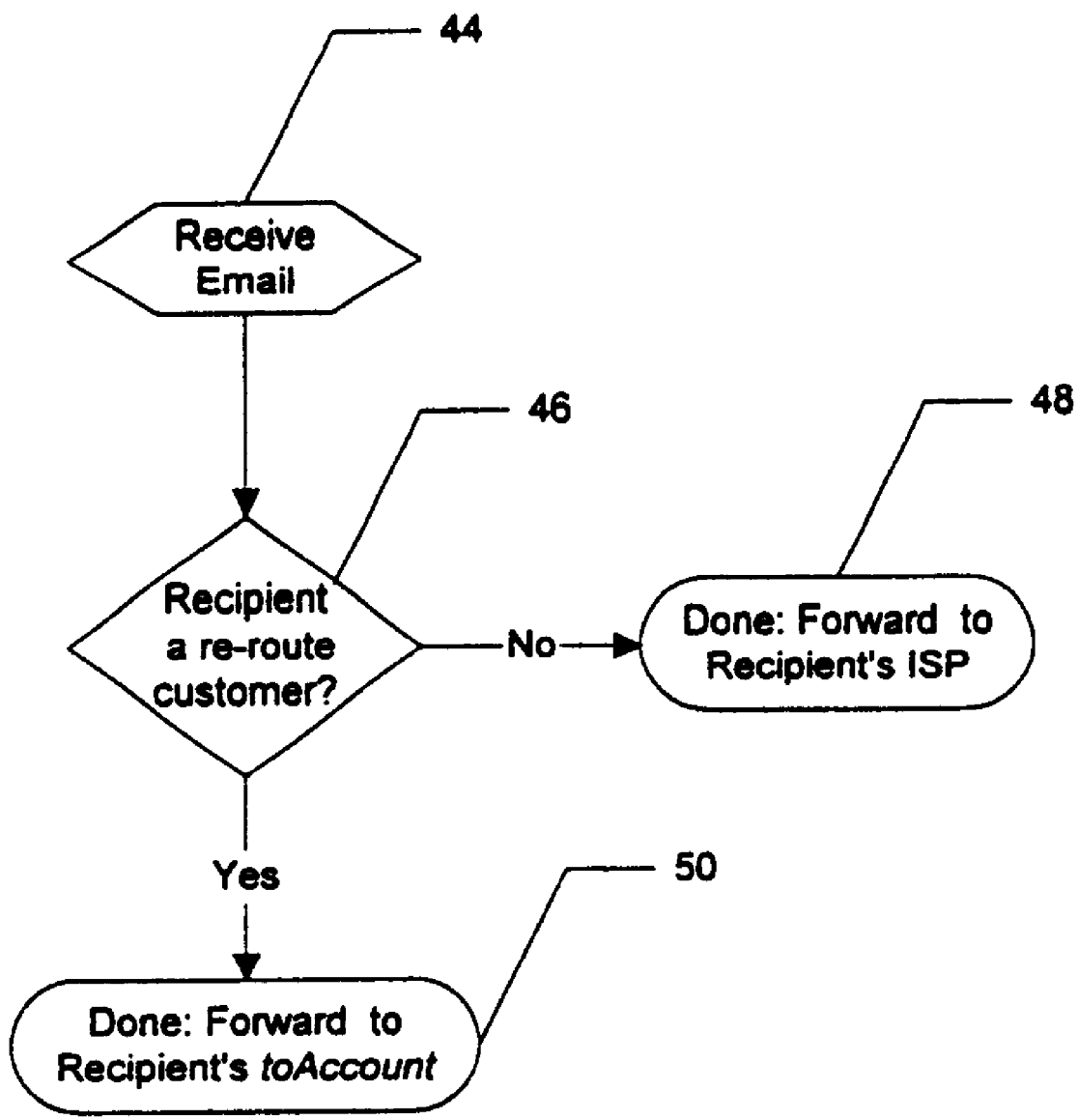
FIG. 3 illustrates the e-mail handler for a re-route customer.

Referring to FIG. 3, the mail exchange authority with pass-through sendmail alternative embodiment re-route handler is shown. In this embodiment, the re-route server becomes the MX authority for the ISP(s) that register with the service. In this instance, the figure illustrates a situation where the re-route server functions as a gateway for all e-mail destined for a number of different ISPs. In this instance, various ISPs subscribe to the re-route service, and all e-mail destined for any of the ISPs that are subscribers initially are routed to the re-route server. In this instance, e-mail is received at the re-route server 44. The server checks to see if the recipient is a re-route customer 46. A re-route customer is an individual who has signed up with the re-route server to have his or her e-mail forwarded to a new address. If the recipient is not a re-route customer 46, the re-route server takes no action with respect to the e-mail, but simply allows it to go forward to the recipient's ISP 48. If, however, the recipient is determined to be a re-route customer, the e-mail is forwarded to the recipient's "toAccount" address which has been provided by the re-route customer to the re-route server 50.

Figure 3A:
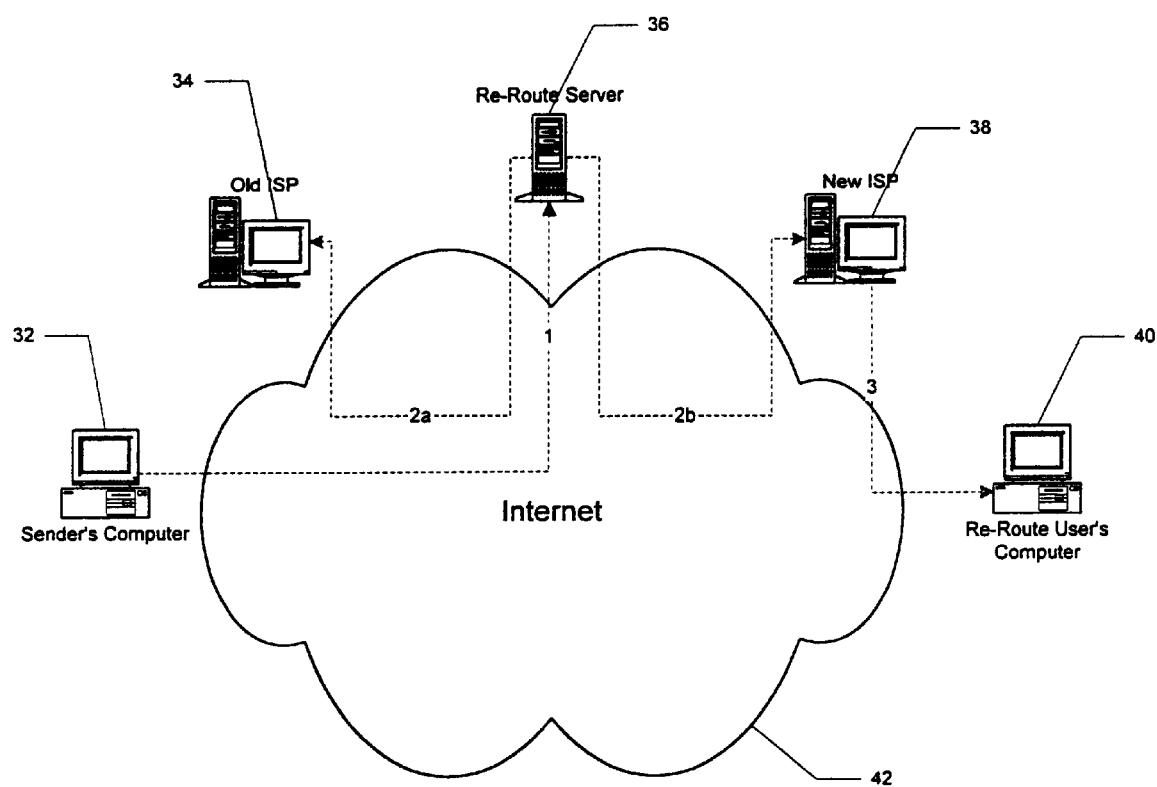
FIG. 3A illustrates the e-mail re-route path for the re-route customer.

Referring to FIG. 3A, the e-mail re-route path of the alternative embodiment of FIG. 3 is shown. Sender computer 32 addresses e-mail to a recipient. That e-mail goes directly to re-route server 36, which makes the determination as to whether the recipient is a re-route customer or not. If the individual is not a re-route customer, the e-mail is simply sent on its way to the old ISP 34. If, however, the re-route server 36 determines that the recipient is a re-route customer, the e-mail is forwarded to the new ISP 38 over the Internet 42 for storage and subsequent download to the recipient 40.

Figure 4:
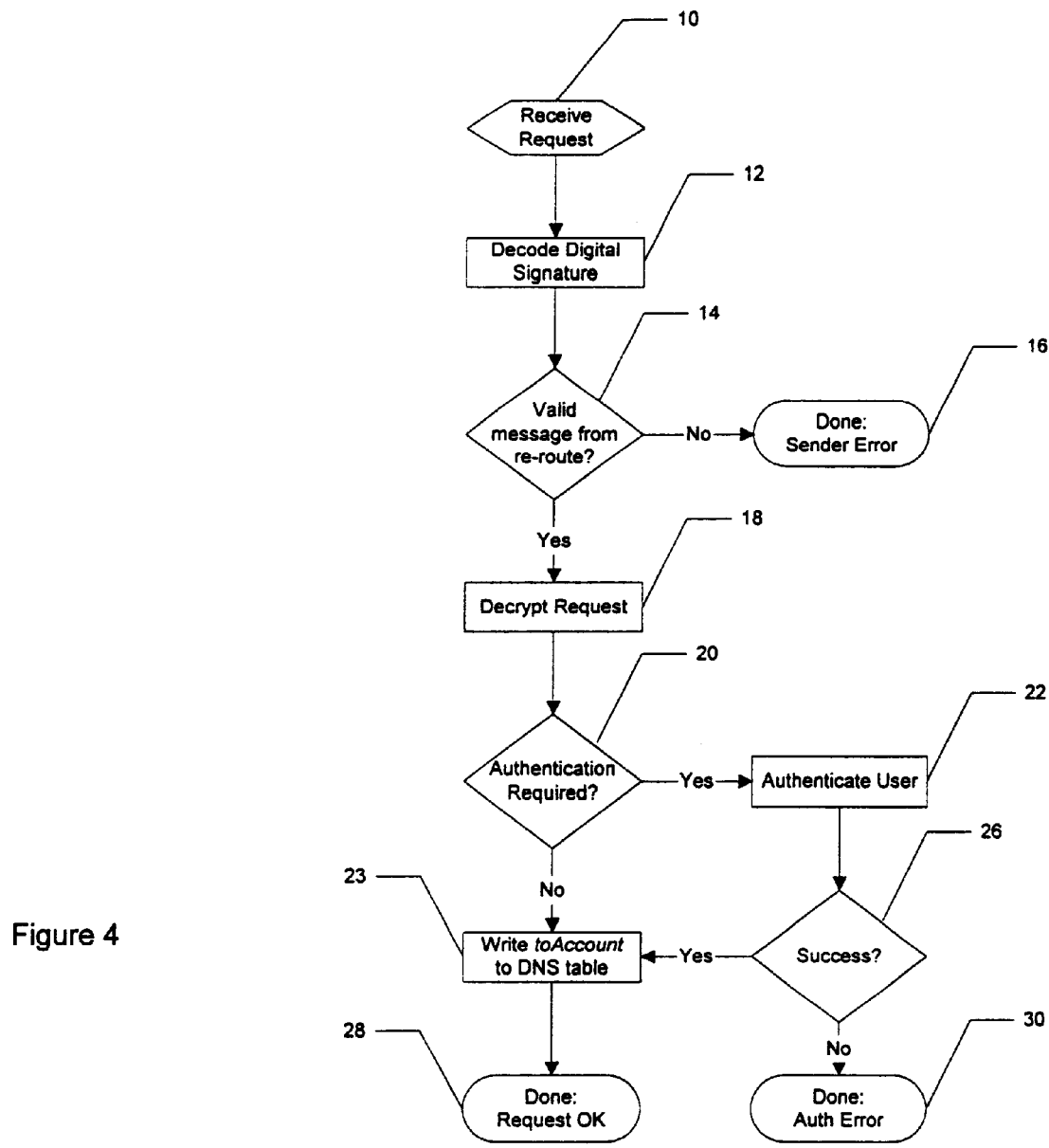
FIG. 4 illustrates the request handler for the DNS table implementation of the present invention.

Referring to FIG. 4, the request handler of yet another alternative embodiment of the present invention is illustrated. This request handler operates in the same respect as FIGS. 1 and 2, except that, after successful authentication 20, 22, 26, or, in the case where authentication is not required, a re-route customer's "toAccount" is written to a DNS table 23, thereby providing an address for the recipient different from that to which messages might be sent. In this instance, a sender might realize that a recipient has moved but does not know the address of the recipient. In this case, the sender sends messages directly to the re-route server in anticipation that this message will be forwarded to the recipient.

Figure 4A:
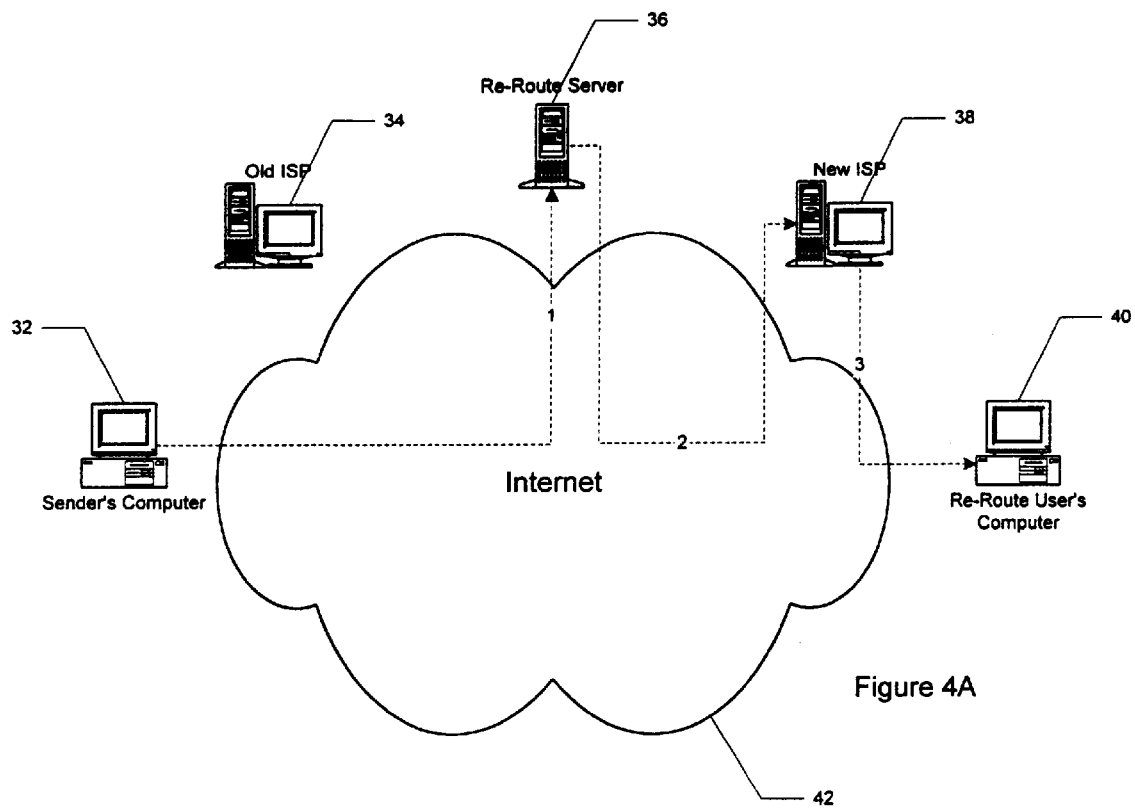
FIG. 4A illustrates the e-mail re-route paths for the DNS table implementation.

Referring to FIG. 4A, the e-mail re-route path of the present invention is illustrated. In this instance, sender's computer 32 sends an e-mail message directly to the re-route server 36 which has the DNS table associated with the new address of the recipient stored therein. Thereafter, re-route server 36 re-addresses the e-mail to the recipient at the new ISP 38 for delivery to the recipient 40 over the Internet 42.

Figure 4B:
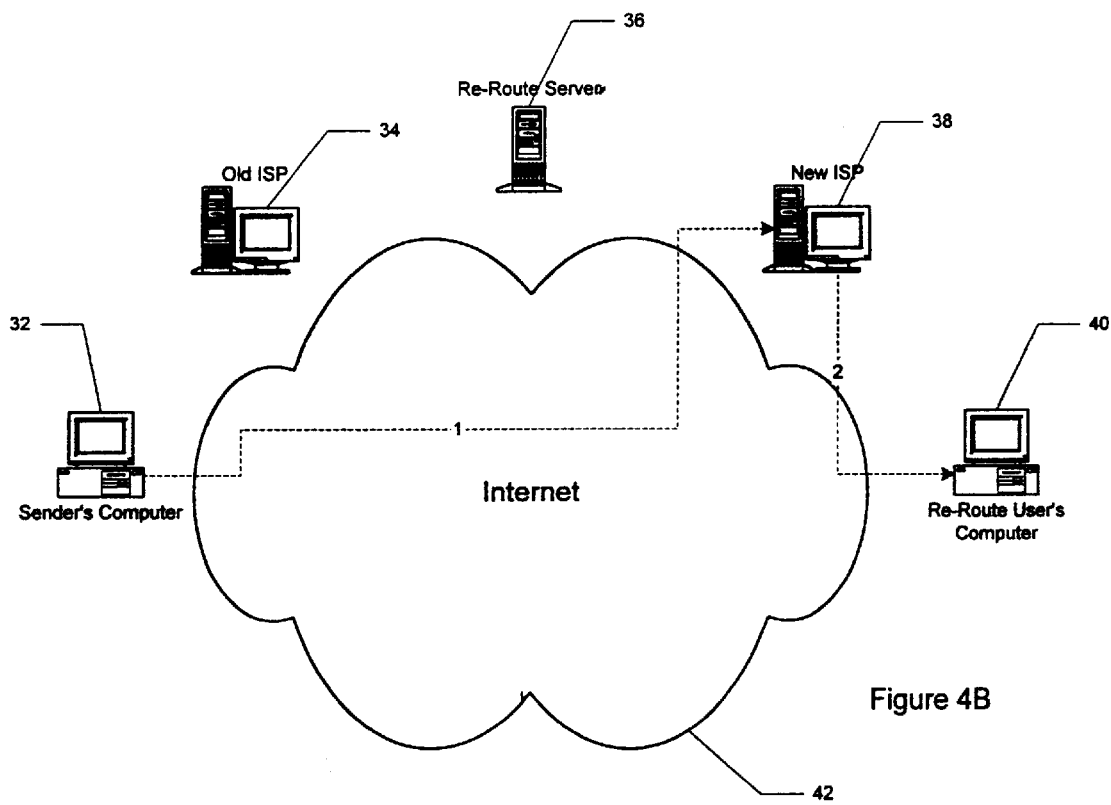
FIG. 4B illustrates the direct e-mail re-route path for the DNS table implementation of the present invention.

Referring to FIG. 4B, the e-mail direct re-route path noted in FIG. 4 is illustrated. Here, the sender computer sends its message to the re-route server 36. In this instance, however, the re-route server 36 provides the new address to the sender's computer 32. Thereafter, the sender's computer 32 can send e-mail to the new ISP address of the recipient 38, which is then forwarded to the recipient 40 over the Internet 42.

Figure 5:
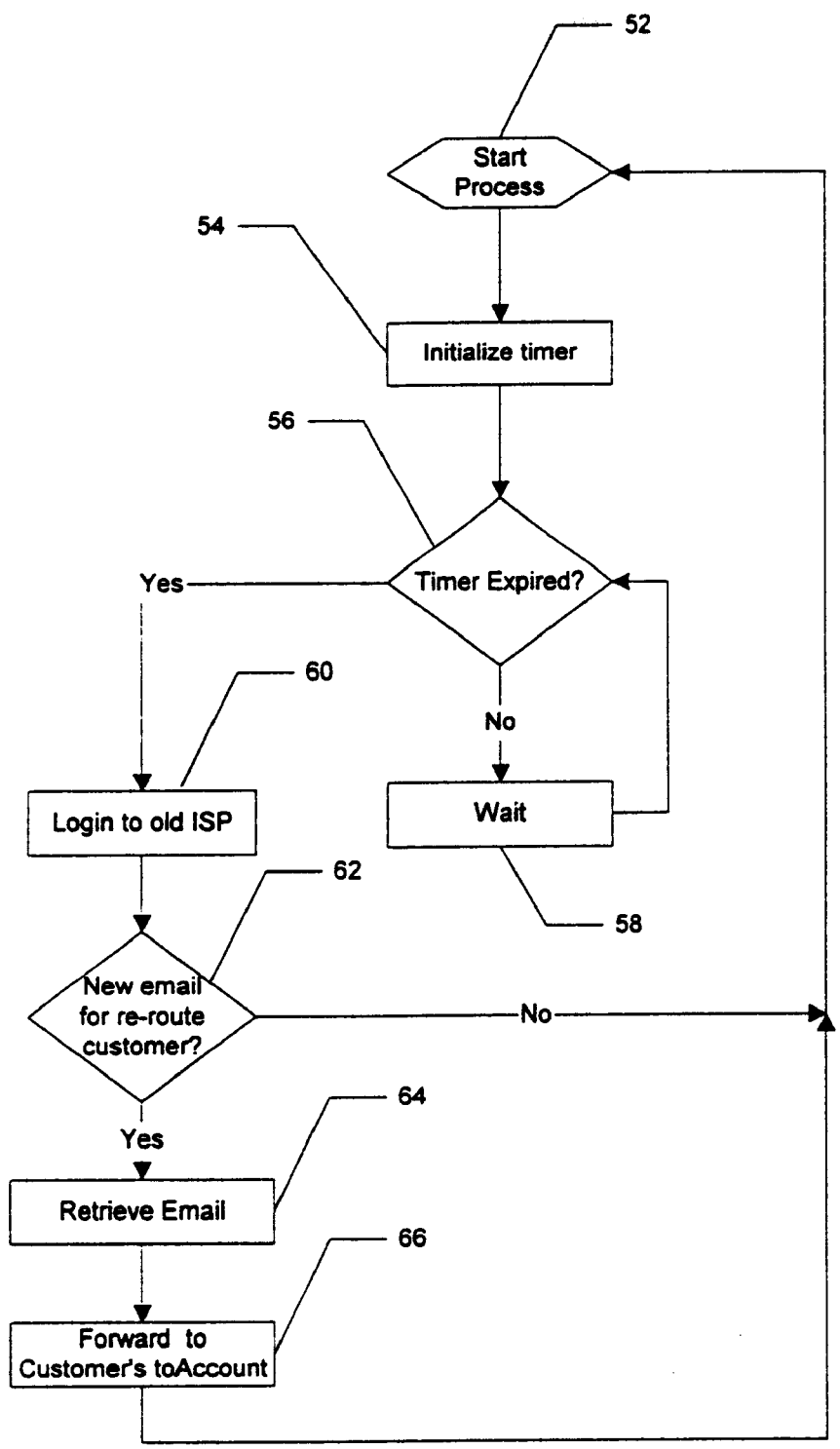
FIG. 5 illustrates a seize and forward implementation for re-route of messages.

Referring to FIG. 5 the seize and forward implementation of the present invention is illustrated. The process is initiated 52. The timer is next initialized 54 to set the frequency with which e-mail is retrieved from the ISP at which a user's e-mail is located. The system at the re-route server determines whether the initialized timer has expired 56, thereby signaling that to retrieval of e-mail must take place. If the timer has not expired, the re-route server waits 58 and continues to query the timer.

If the timer has expired, the re-route server logs onto the old ISP 60 from which mail must be retrieved. The re-route server inquires if there is mail for the specific re-route customer 62. If e-mail is present, the e-mail is retrieved by the re-route server 64 and forwarded to the customer's toAccount 66 which is known to the re-route server. Thereafter the process begins again and waits until the next retrieval time. If there is no e-mail for the re-route customer, the re-route server simply waits until the next time interval for retrieval to be attempted.

Figure 5A:
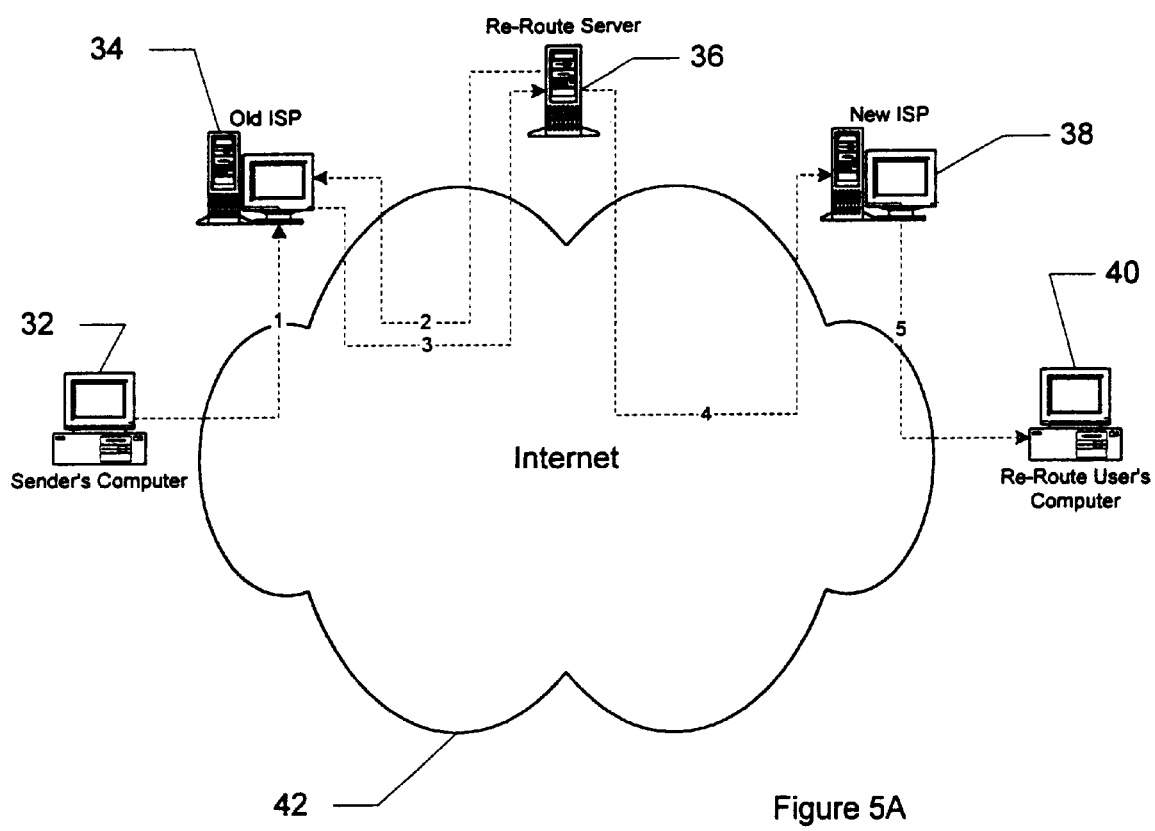
FIG. 5A illustrates the e-mail path for the seize and forward implementation of the present invention.

Referring to FIG. 5A the e-mail re-route path for the seize and forward implementation is illustrated. Sending computer 32 send e-mail to the re-route customer at the old ISP. The old ISP recognizes that this is a former subscriber and stores the e-mail. Re-route server 36 makes in retrieval inquiry with the former ISP 34. Mail is then downloaded to the re-route server 36 where it is forwarded to the new address at a new ISP 38 over the internet 42. Thereafter, the recipient/re-route customer 40, retrieves the e-mail in the normal course of activities.

Figure 6:
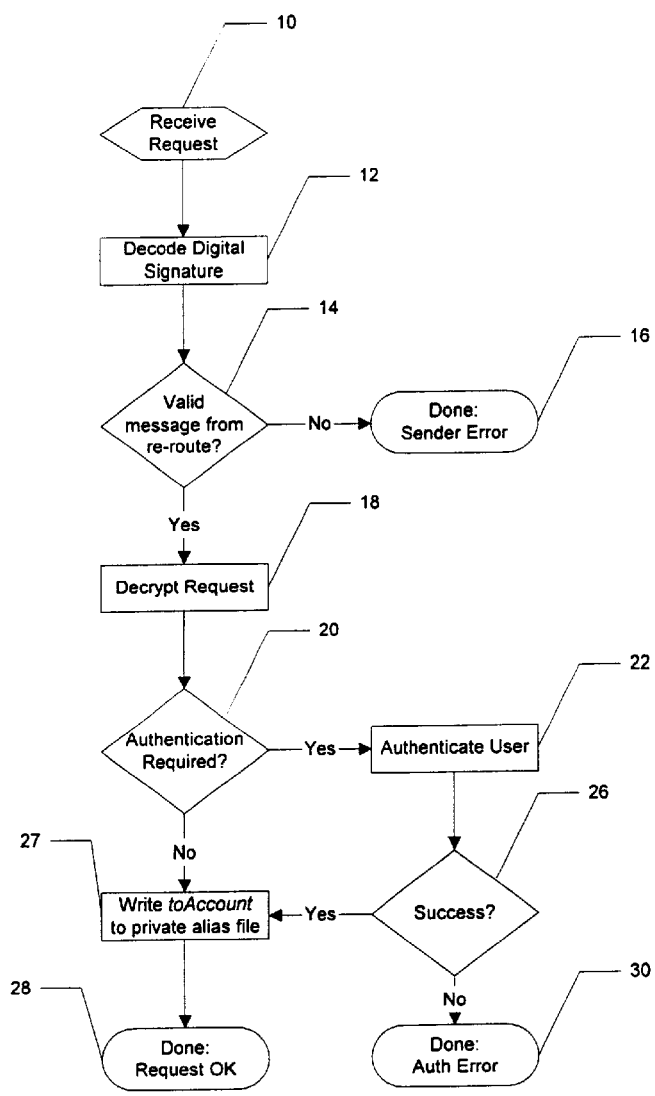
FIG. 6 illustrates the request handler for the SMTP wrapper implementation of the present invention.

Referring to FIG. 6, the request handler for yet another alternative embodiment of the present invention is illustrated. Again, this request handler functions in exactly the same manner as that described in FIG. 1 (above), except that rather than writing the "toAccount" to a .forward file or to an alias file, the toAccount is written to a private alias file for subsequent use in forwarding e-mail to the new ISP.

Figure 6A:
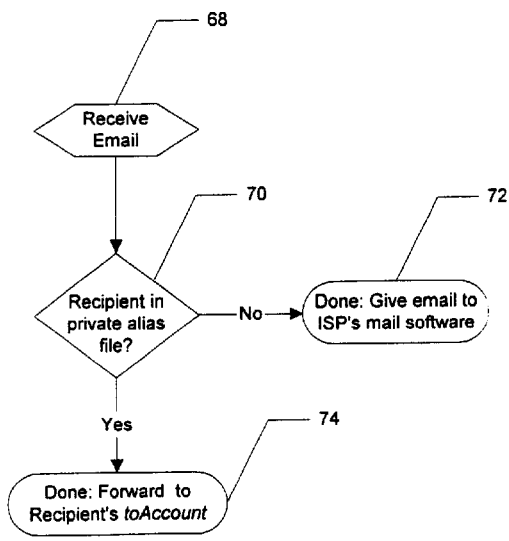
FIG. 6A illustrates the e-mail handler for the SMTP wrapper implementation of the present invention.

Referring to FIG. 6A, the e-mail handler of the alternative preferred embodiment described in FIG. 6 is illustrated. E-mail for the recipient is received 68, and a determination is made by the re-route server whether the recipient is in the private alias file 70. If the individual is not in the private alias file, the e-mail is presented to the old ISPs e-mail software 72. If, however, the recipient is in the private alias file 70, then the e-mail is forwarded to the recipient's "toAccount" 74.

Figure 6B:
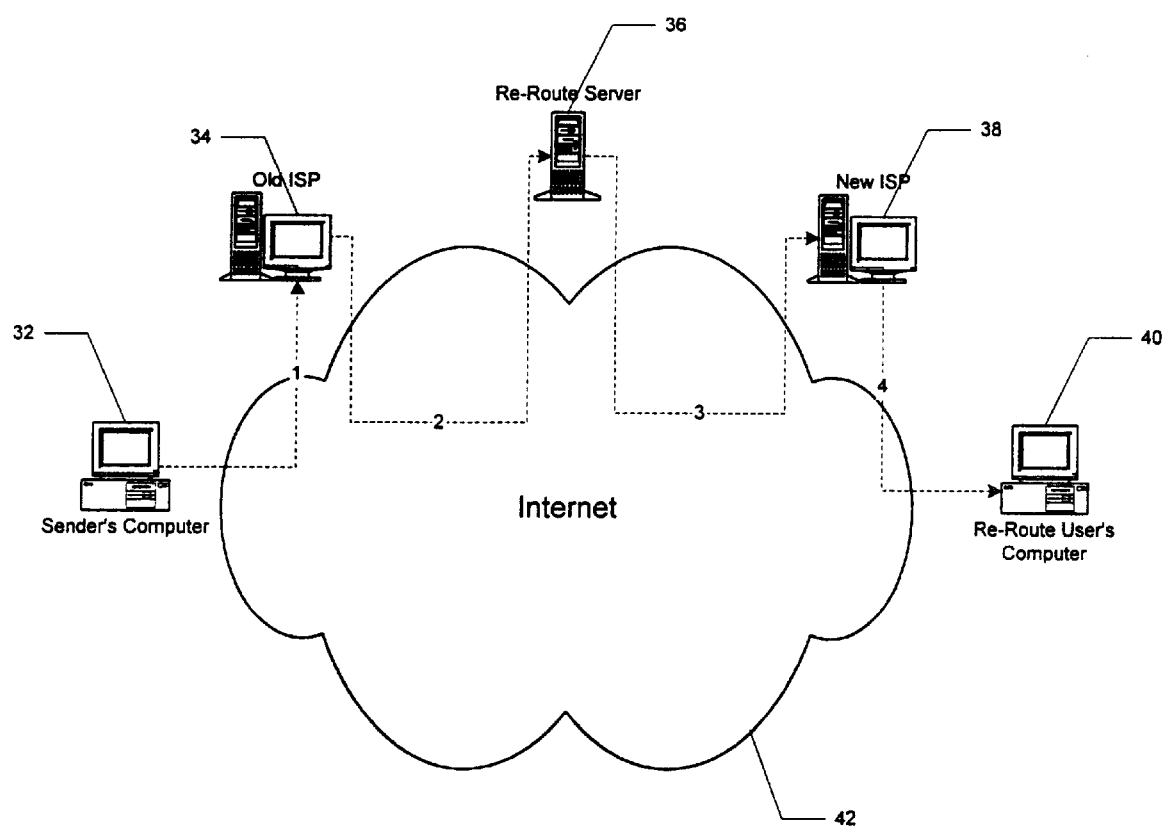
FIG. 6B illustrates the e-mail re-route path for the SMTP wrapper implementation of the present invention.

The e-mail re-route path of the embodiment of FIG. 6 is illustrated in FIG. 6B. This re-route path is similar in all respects to that described in FIG. 1A, except that re-route server 36 has a private alias file which determines the address to which mail for the recipient will proceed.

Figure 7:
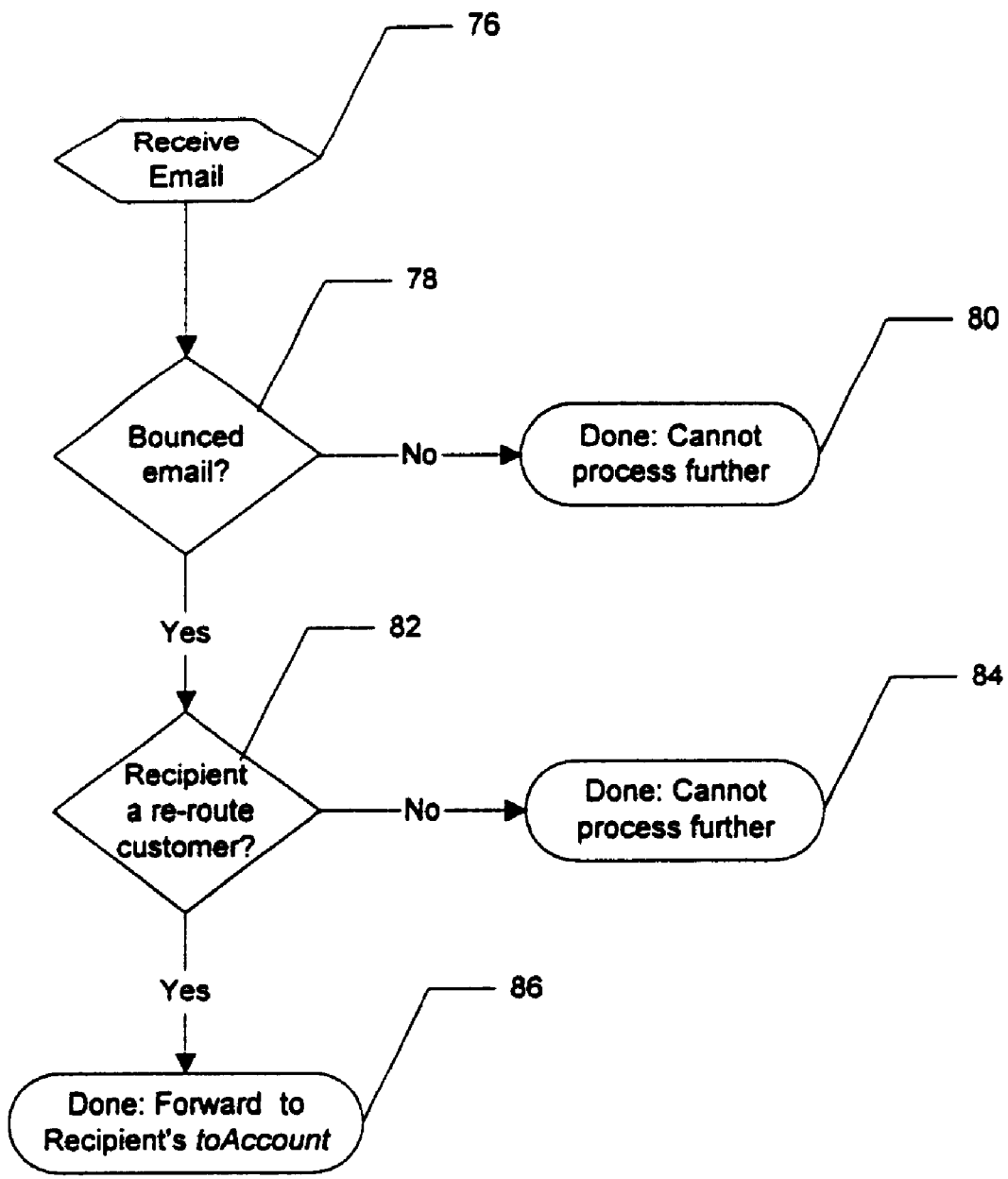
FIG. 7 illustrates the e-mail handler for bounced mail.

Referring to FIG. 7, another alternative embodiment of the present invention is illustrated. In this instance, ISPs subscribe to the service of the re-route invention. When an old ISP bounces mail that is sent to a former recipient who was a subscriber to the old ISP, a bounced mail message is sent both to the sender's computer and to the re-route server. Thereafter, if the re-route server determines that the mail is destined for a recipient who is a re-route customer, it is forwarded appropriately. For example, mail is received at the re-route server 76. The re-route server determines if the mail is bounced mail 78 coming from an old ISP. If the mail coming to the re-route server is not bounced mail 80, the process terminates. If the mail reaching the re-route server is bounced mail, the re-route server determines if the mail is addressed to a recipient who is a re-route customer 82. If the person to whom the bounced mail is addressed is not a re-route customer, the process is terminated 84. If, however, the e-mail is destined to a re-route customer having a "toAccount" with the re-route server, that mail is forwarded to the recipient's latest e-mail address 86.

Figure 7A:
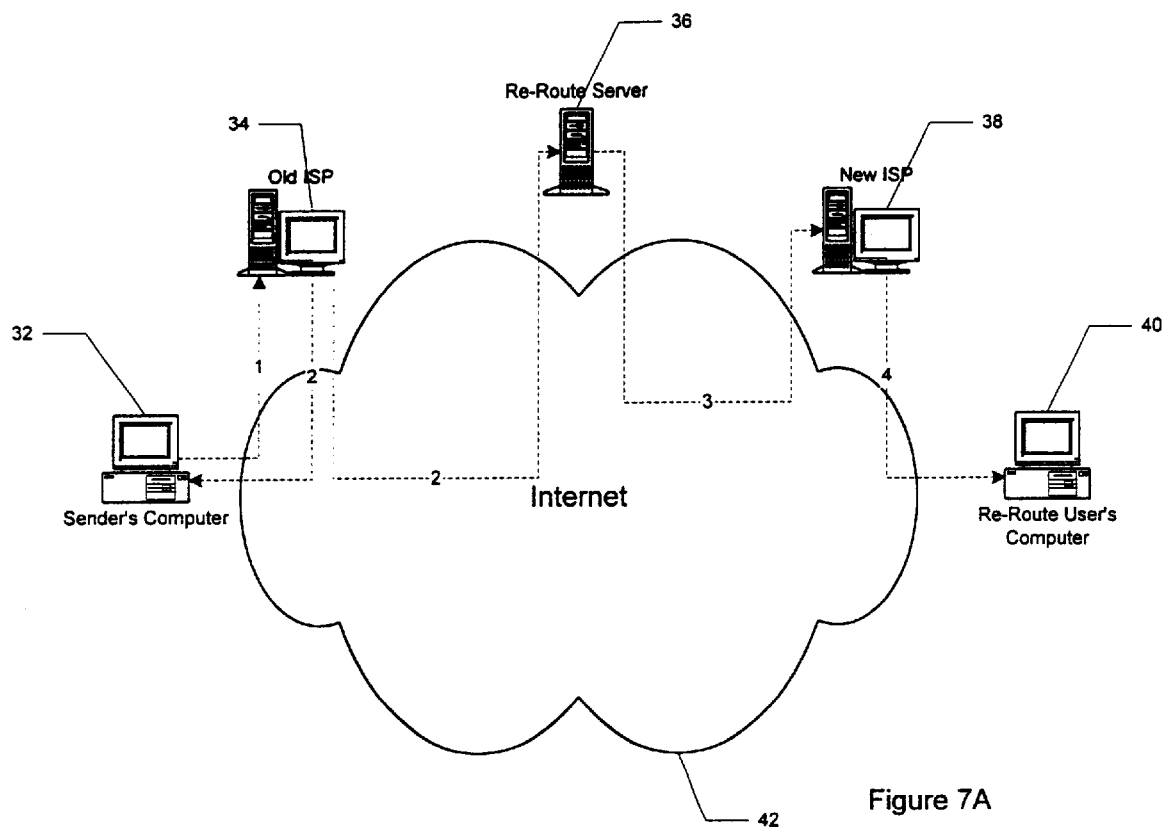
FIG. 7A illustrates the e-mail re-route path for bounced mail.

Referring to FIG. 7A, the e-mail re-route path of the embodiment noted in FIG. 7 is illustrated. In this instance, sender's computer 32 sends e-mail destined to the old e-mail address of a recipient to the old ISP 34. Old ISP 34 is a subscriber to the re-route service of the present invention. It sends a bounced mail message to the sender's computer 32 and also to the re-route server 36. If the recipient to whom the mail is addressed is a customer of the re-route server 36, the re-route server checks to determine the new e-mail address of the recipient and forwards the e-mail over the Internet 42 to the new ISP 38. New ISP 38 then forwards the mail to the recipient 40.

Figure 8:
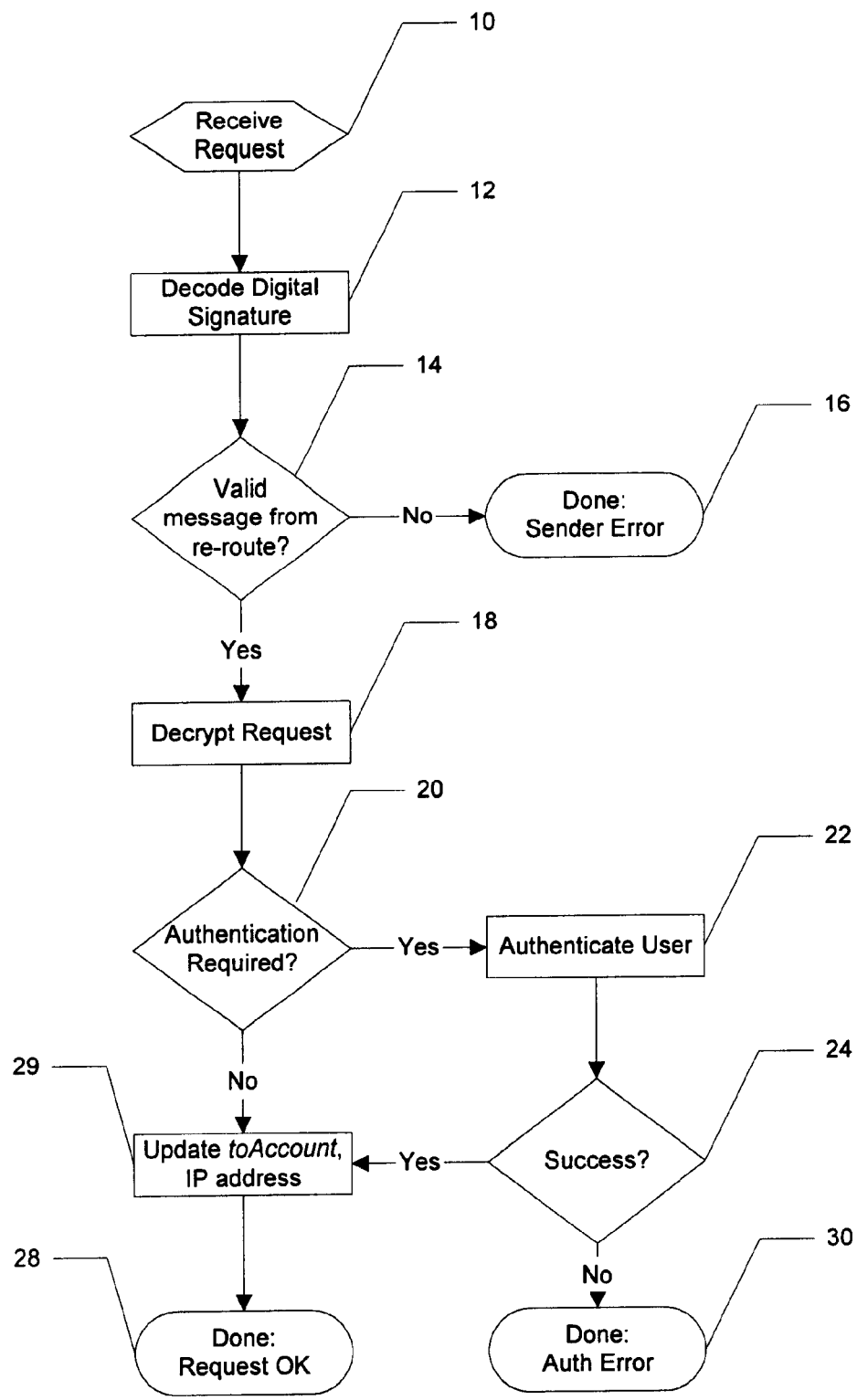
FIG. 8 illustrates the request handler for IPv6 address implementation of the present invention.

Referring to FIG. 8, yet another alternative embodiment of the present invention is illustrated. In this instance, the request handler operates in the same manner as first noted in FIG. 1 (above). However, after appropriate authentication processes 20, 22, 24 the toAccount and IP address of the recipient is updated 29.

Figure 8A:
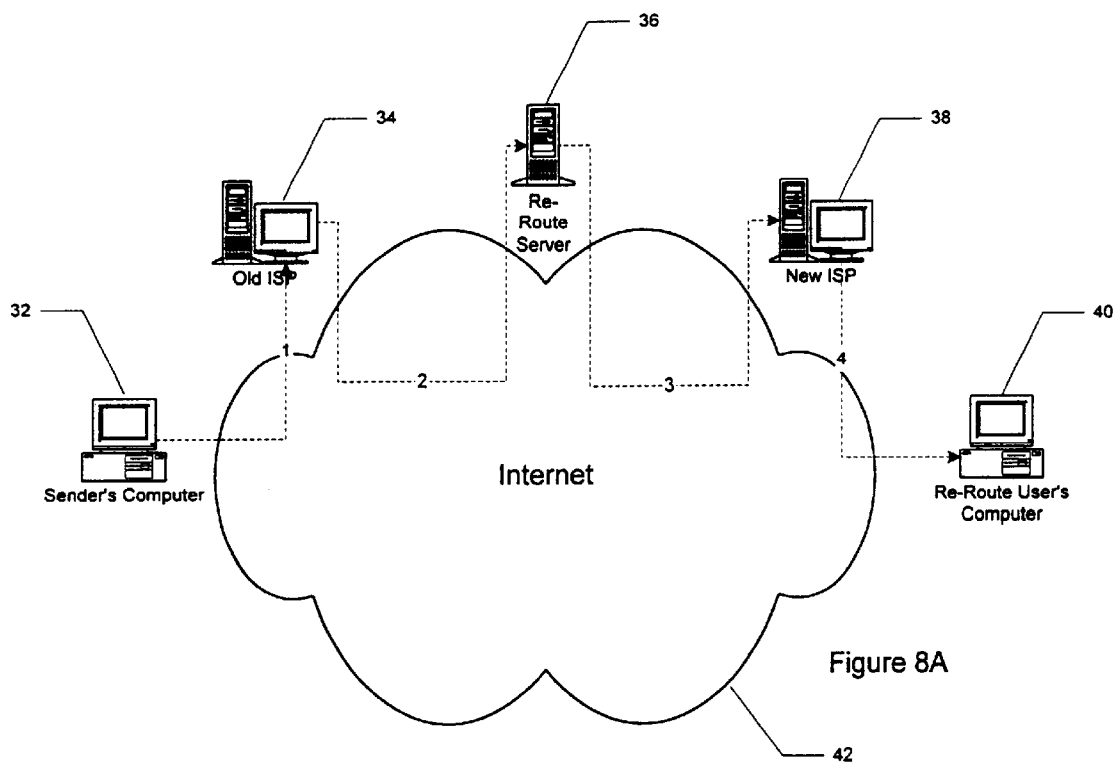
FIG. 8A illustrates the e-mail re-route path for the IPv6 address implementation.

Referring to FIG. 8A, the re-route path for the embodiment described in FIG. 8 is shown. In this instance, a sending computer 32 sends an e-mail addressed to the old ISP 34. The old ISP 34, knowing that the recipient has moved, forwards the message to the re-route server 36. The re-route server 36 has had its toAccount and IP address for the recipient updated. The e-mail address is changed by the re-route server 36 and directed to the new ISP 38 for deliver over the Internet 42 to the recipient 40.

Figure 8B:
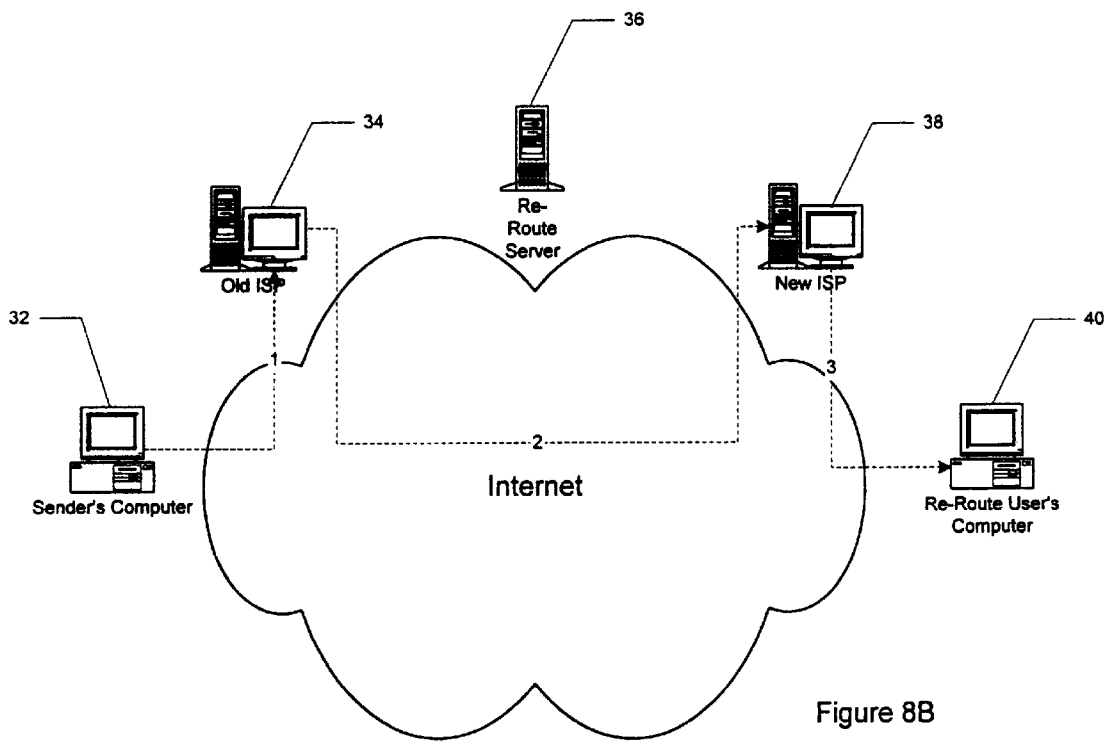
FIG. 8B illustrates the direct e-mail re-route path for the IPv6 address implementation.

Referring to FIG. 8B, the e-mail re-route direct path is shown. In this instance, re-route server 36 provides the appropriate toAccount and IP address update to the old ISP 34. Thereafter, when the sending computer 32 sends an e-mail message to the recipient's address at the old ISP 34, the old ISP 34 can forward that e-mail to the new ISP 38 over the Internet 42 for delivery to the recipient 40.

Figure 9:
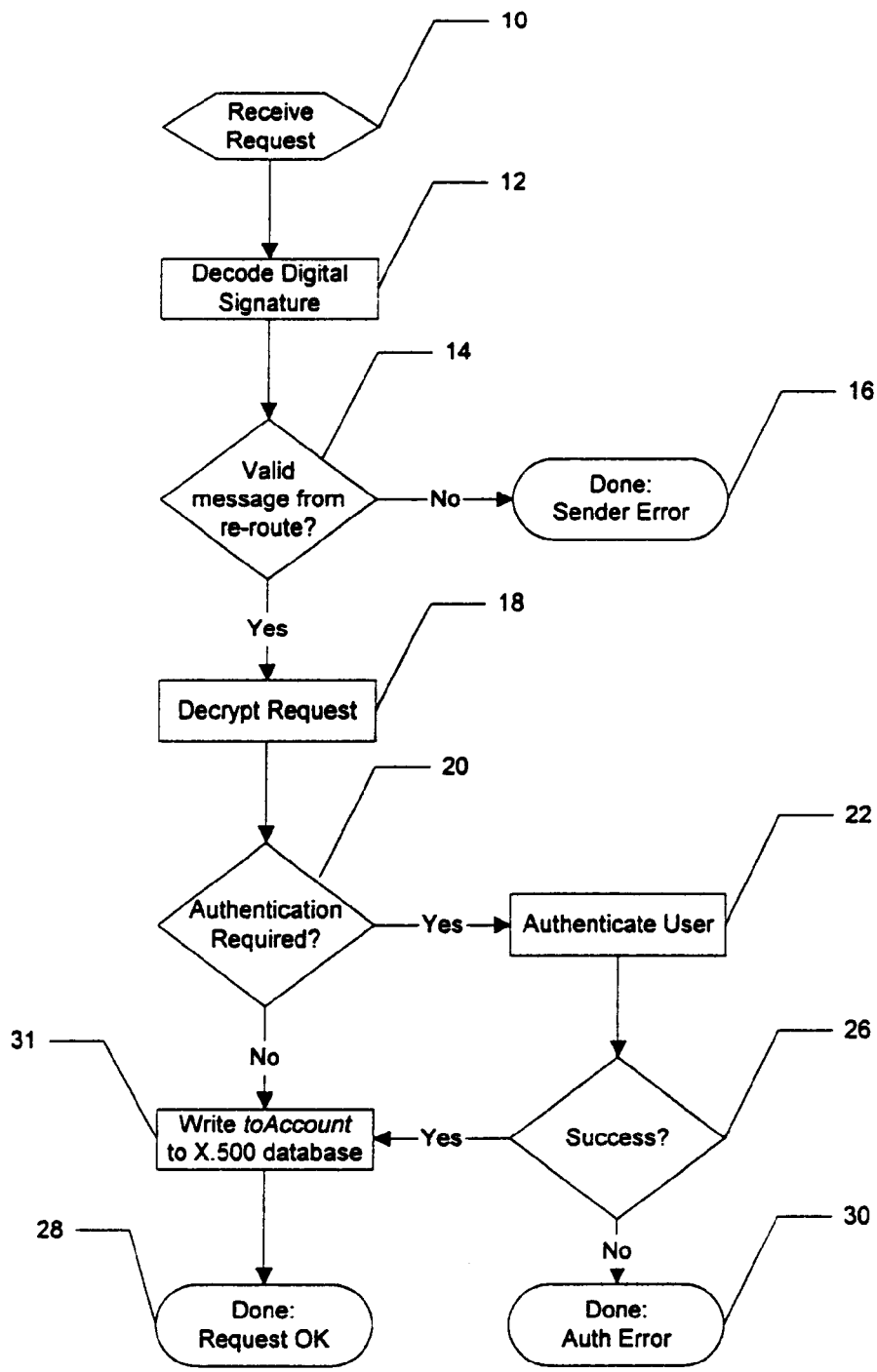
FIG. 9 illustrates the X.500 database implementation of the present invention.

Referring to FIG. 9, an alternative embodiment of the present invention is shown. In this instance, request handler functions in the same manner as noted in FIG. 1 (above). However, after appropriate authentication processes 20, 22, 26, the toAccount is updated and written to a X.500 database. The database is subsequently provided to the old ISP for processing of re-routed e-mails.

Figure 9A:
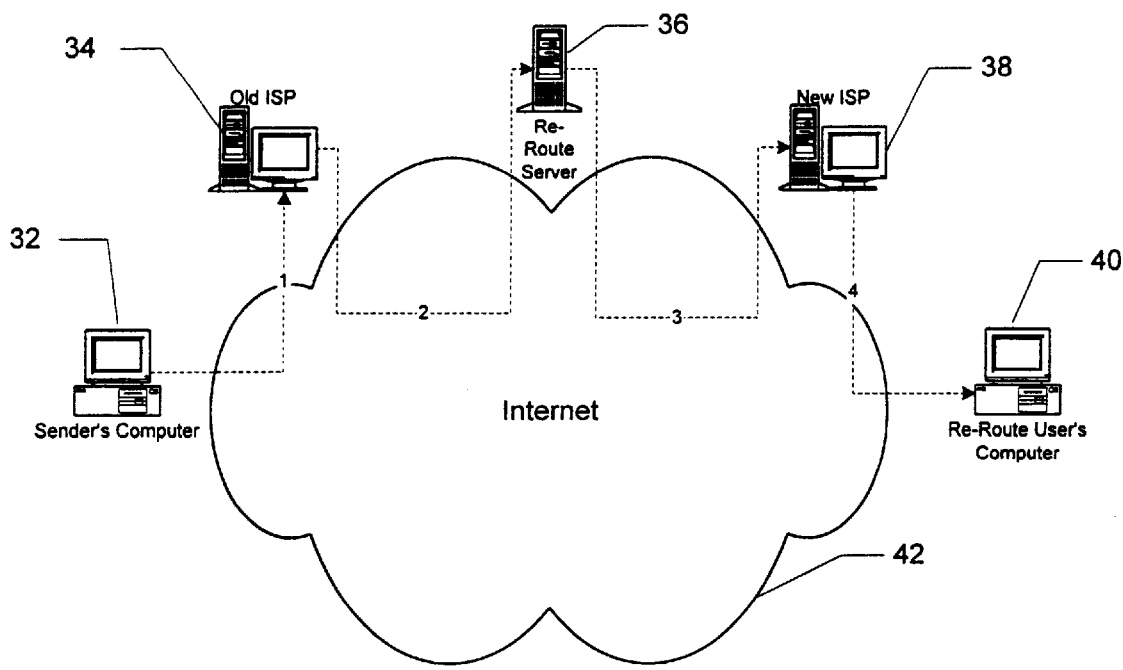
FIG. 9A illustrates the e-mail re-route path through the re-route server for the X.500 implementation of the present invention.

Referring to FIG. 9A, the indirect e-mail re-route path of the embodiment of FIG. 9 is illustrated. In this case, re-route server 36 provides the updated X.500 database to the old ISP 34. Thereafter, a sender's computer 32 sends an e-mail to a recipient at the old ISP 34. Old ISP 34 matches the incoming e-mail with the X.500 database and forward the e-mail on to the re-route server 36 via the Internet 42. The re-route server 36 then handles sending the e-mail to the recipient. The e-mail is re-addressed and sent to the new ISP 38 over the Internet 42 for subsequent delivery to the recipient 40.

Figure 9B:
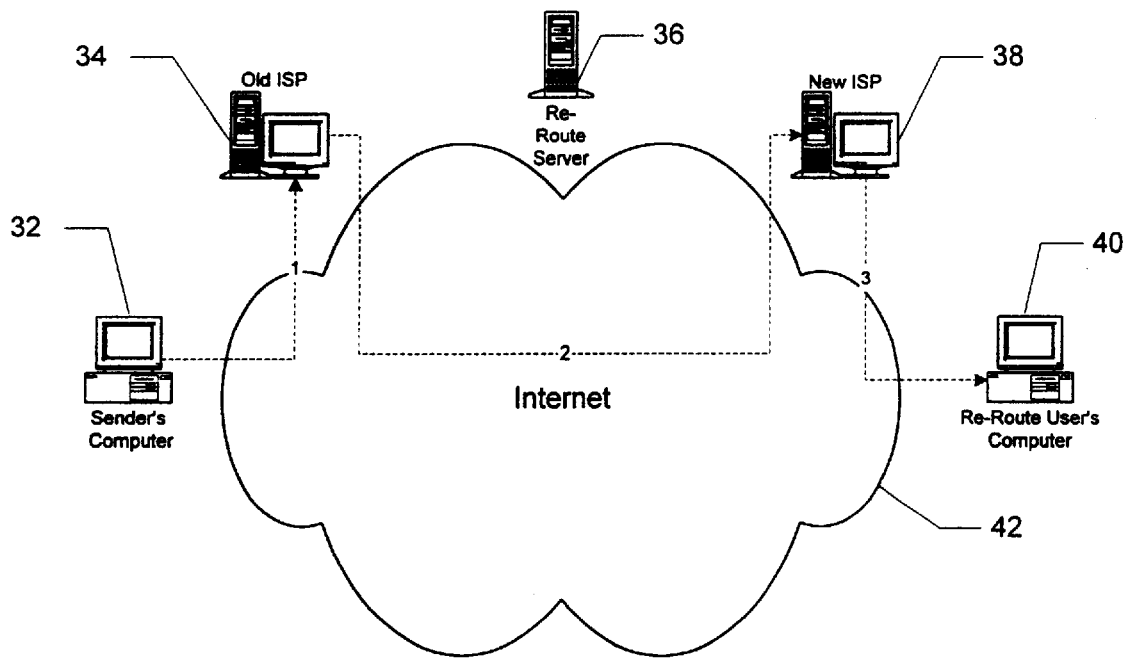
FIG. 9B illustrates the direct e-mail re-route path for the X.500 database implementation of the present invention.

Referring to FIG. 9B, the direct e-mail re-route path of the embodiment of FIG. 9 is illustrated. In this instance, re-route server 36 provides the updated X.500 database to the old ISP 34. Thereafter, a sender's computer 32 sends an e-mail to a recipient at the old ISP 34. Old ISP 34 matches the incoming e-mail with the X.500 database and new address for the recipient. Thereafter, the e-mail is re-addressed and sent to the new ISP 38 over the Internet 42 for subsequent delivery to the recipient 40.

Figure 10:
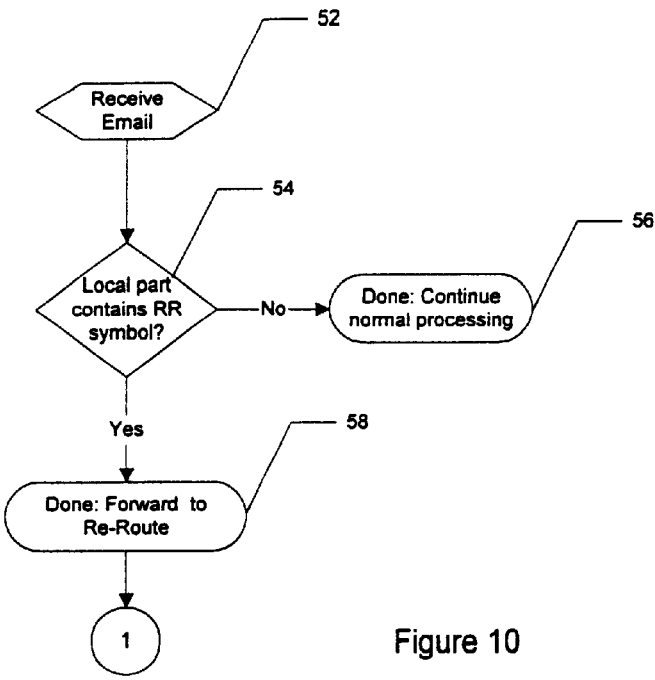
FIG. 10 illustrates the re-route symbol implementation of the present invention.

Referring to FIG. 10, an additional alternative embodiment of the present invention is illustrated. In this instance, an old ISP receives e-mail 52. The server of the old ISP reviews the e-mail to determine if the e-mail contains a symbol indicative of the fact that this e-mail is to be re-routed to another location 54. If there is no re-route symbol, processing of the e-mail continues in the normal fashion 56. In the event that there is a re-route symbol associated with the e-mail message, the message is forwarded to the re-route server 58.

Figure 10A:
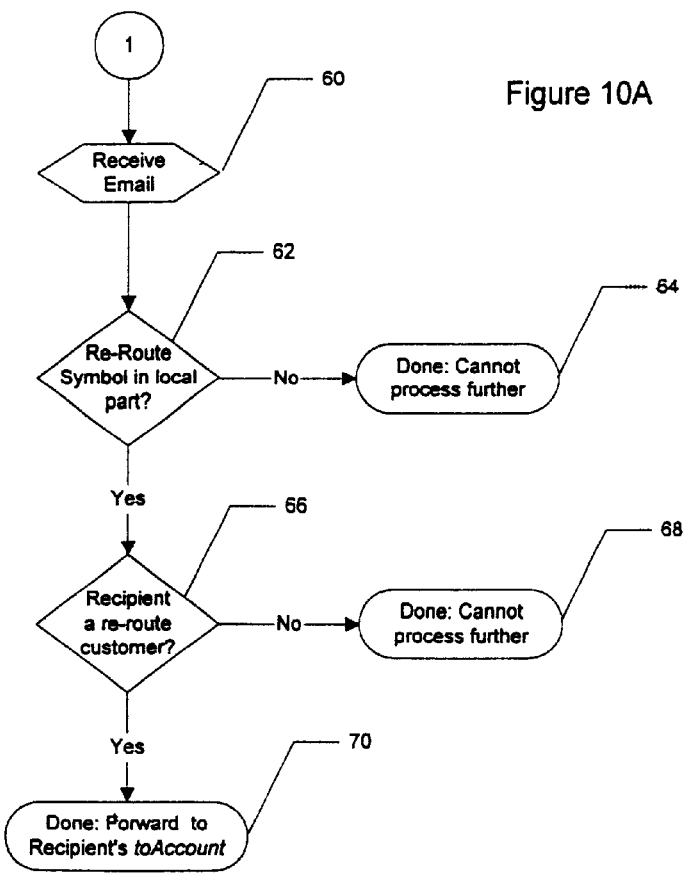
FIG. 10A illustrates the e-mail handler for the re-route symbol implementation of the present invention.

Referring to FIG. 10A, e-mail handling in the re-route server is illustrated. The re-routed e-mail is received at the e-mail handler of the re-route server 60. The re-route server determines if the re-route symbol is present 62. If there is no re-route symbol, processing ceases. If there is a re-route symbol present, the re-route server determines if the recipient of the message is a re-route customer 66. If the recipient is not a re-route customer, processing terminates 68. If the individual is a re-route customer, the e-mail is forwarded to the recipient's toAccount 70.

Figure 10B:
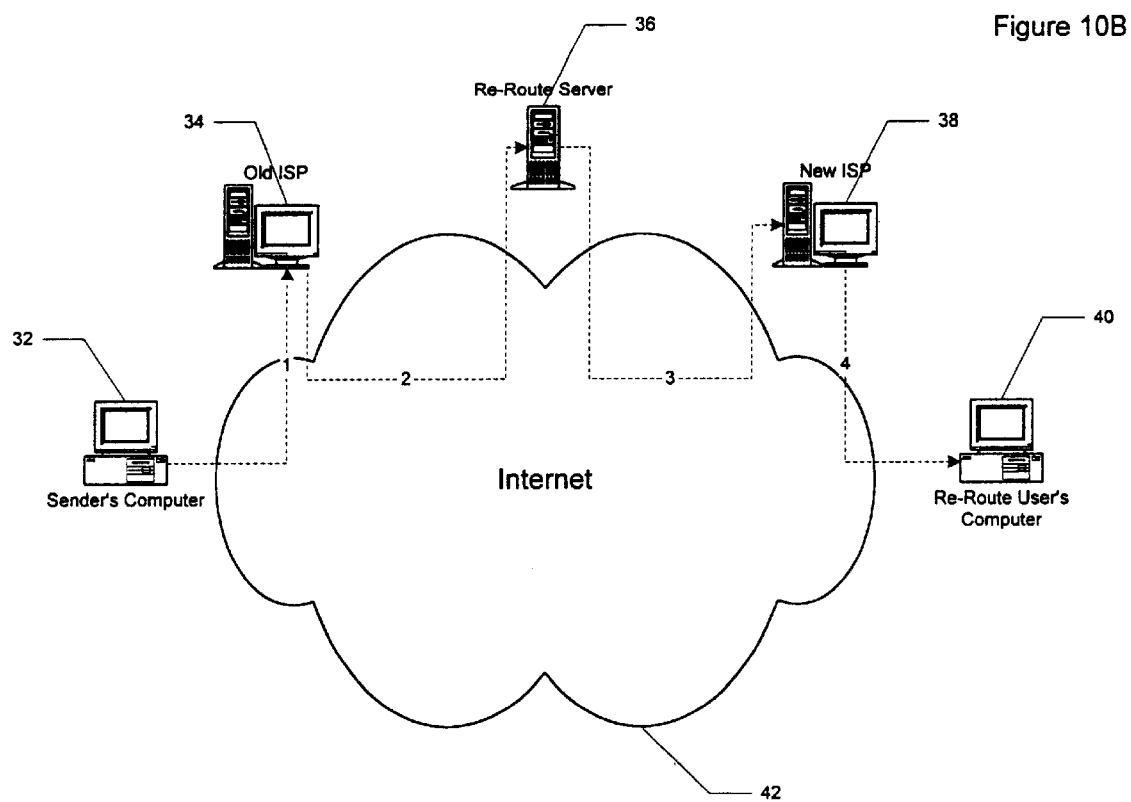
FIG. 10B illustrates the e-mail re-route path for the e-route symbol implementation of the present invention.

Referring to FIG. 10B, the e-mail re-route path is shown. Sender 32 sends an e-mail message that is knows must be re-routed to the recipient. However, the sending computer 32 only knows the recipient's old e-mail address. Therefor, the e-mail is addressed to the old ISP 34. However, the message also comprises a re-route symbol. Old ISP 34 recognizes the re-route symbol and sends the e-mail on to the re-route server 36. Re-route server 36 determines if the recipient is a re-route customer and, if so, forwards the e-mail to the new ISP 38 over the Internet 42 for delivery to the recipient's computer 40.

Figure 11:
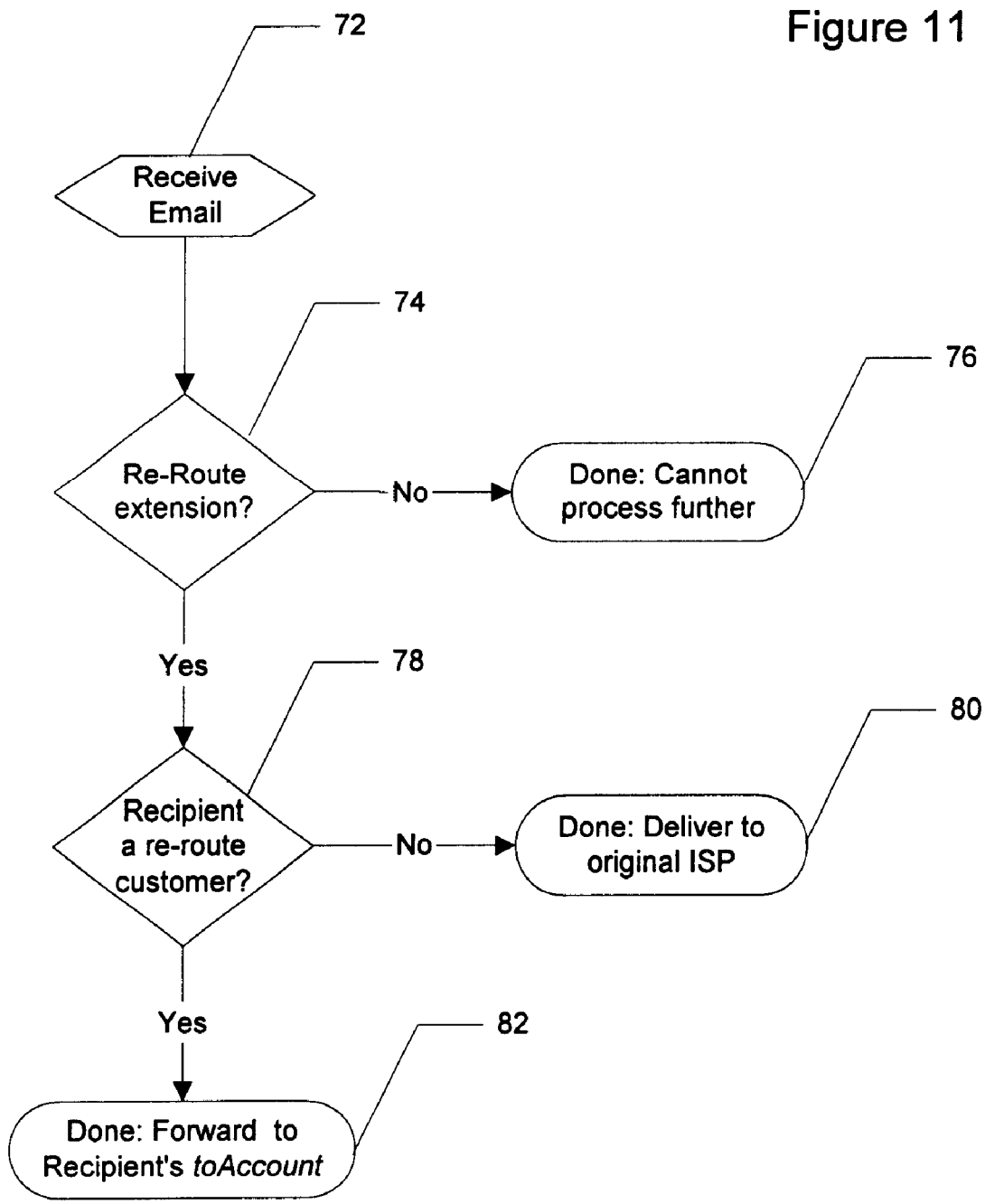
FIG. 11 illustrates e-mail handler for the re-route extension implementation of the present invention.

Referring to FIG. 11, yet another embodiment of the present invention is illustrated. In this instance, e-mail is received 72 at the re-route server. The re-route server determines if there is a re-route extension on the e-mail address 74. If the extension is not present, processing ceases 76. If a re-route extension is present on the e-mail message, the re-route server determines if the recipient is a re-route customer 78, that is, an individual who is registered for the re-route service. If the individual is not a re-route customer, the message is delivered to the original ISP 80. If, however, the recipient is a re-route customer, the e-mail is forwarded to the recipient's toAccount, as stored by the re-route server 82.

Figure 11A:
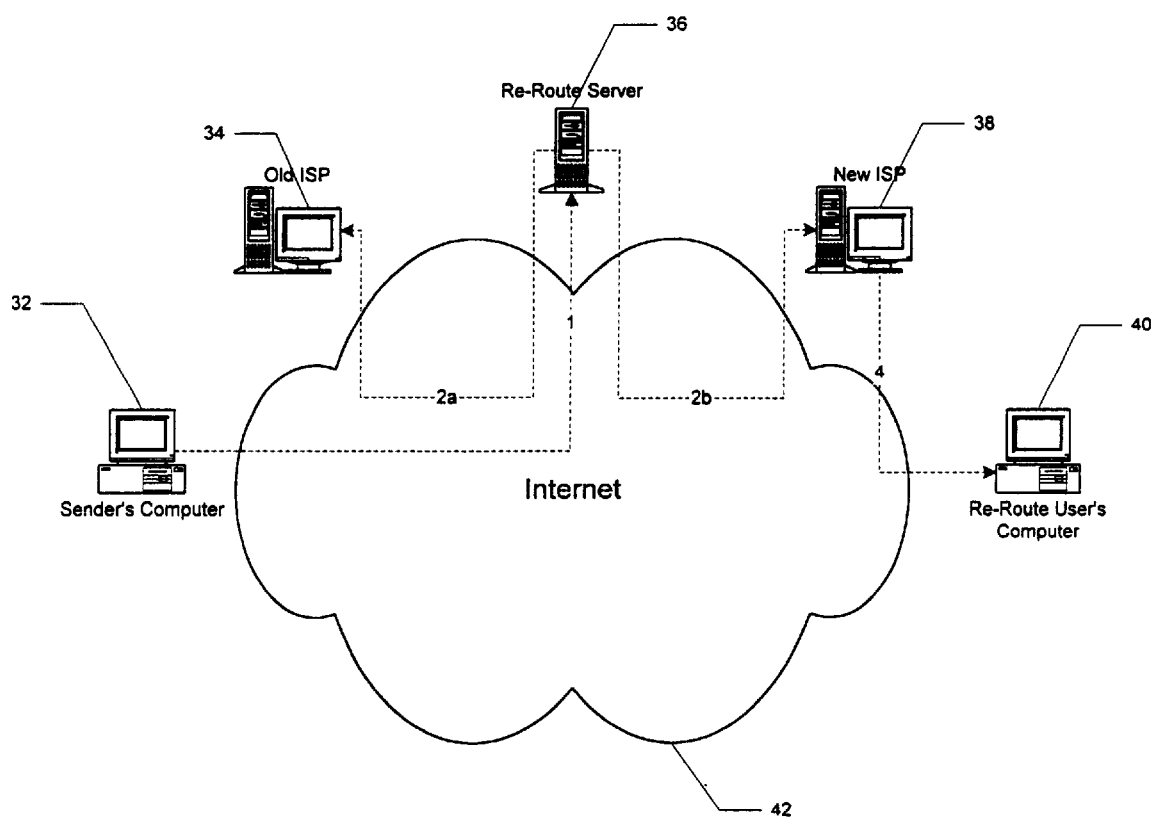
FIG. 11A illustrates the e-mail re-route path for the re-route extension implementation of the present invention.

Referring to FIG. 11A, the e-mail re-route path of the embodiment illustrated in FIG. 11 is shown. Sending computer 32 sends an e-mail message with a re-route extension to the re-route server 36. Re-route server 36 determines if the individual to whom the message is sent is a re-route customer. If the individual is not a re-route customer, the message is sent to the old ISP 34. If the individual is a re-route customer, the message is re-routed to the new ISP 38 over the Internet 42 for delivery to the recipient 40.

Figure 12:
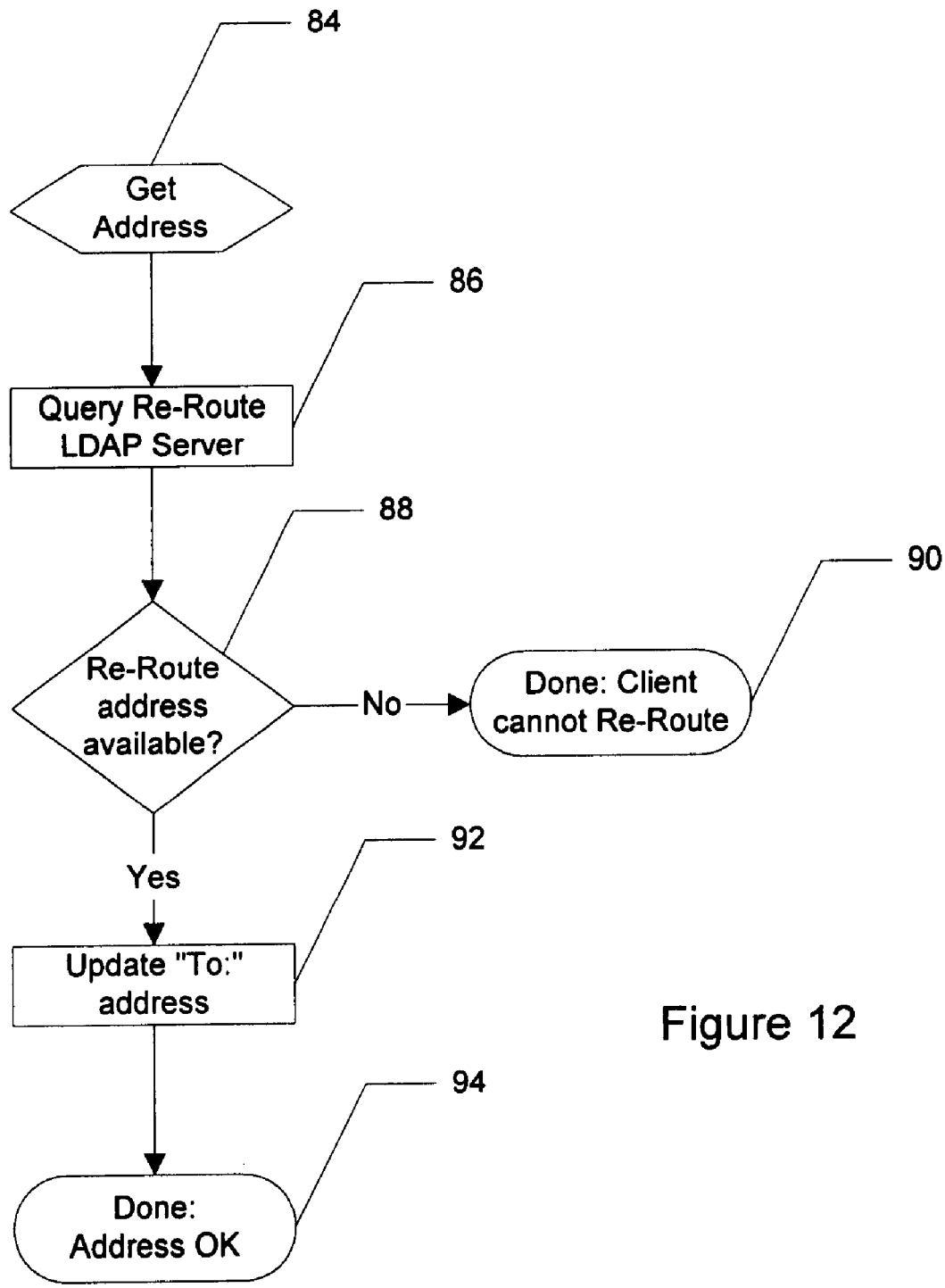
FIG. 12 illustrates the Lightweight Directory Access Protocol (LDAP) client flow of the present invention.

Referring to FIG. 12, the LDAP client functionality is shown. A request is first made to obtain an address for a recipient 84 that a sender knows has moved. The re-route LDAP server is queried 86 for the re-route address. The re-route server determines if a re-route address is available 88. If no address is available, the client can not re-route the e-mail 90. If a new e-mail address is available, the "to" address for the recipient is updated in the client computer 92. Thereafter, the address update is completed and e-mail messages can be sent.

Figure 12A:
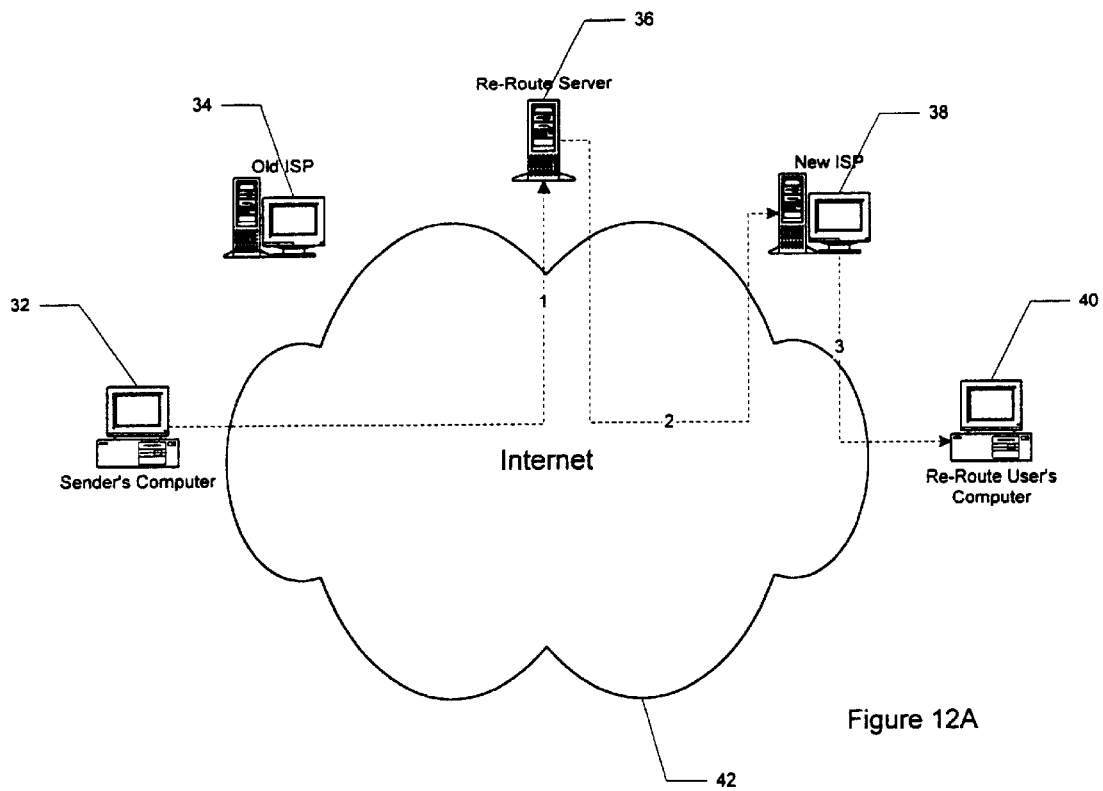
FIG. 12A illustrates the e-mail re-route path for the LDAP implementation of the present invention.

Referring to FIG. 12A, the e-mail re-route path of the embodiment noted in FIG. 12 is illustrated. Sending computer 32 queries the re-route server computer 36 for a re-route address for a recipient. This is the instance where the sending computer knows that the recipient has moved, but is unaware of the new address. If there is a re-route address for the recipient, the mail is forwarded to the new ISP 38 over the Internet 42 for delivery to the recipient 40. In addition, the re-route server notifies the sender's computer to update its "to" address file.

Figure 12B:
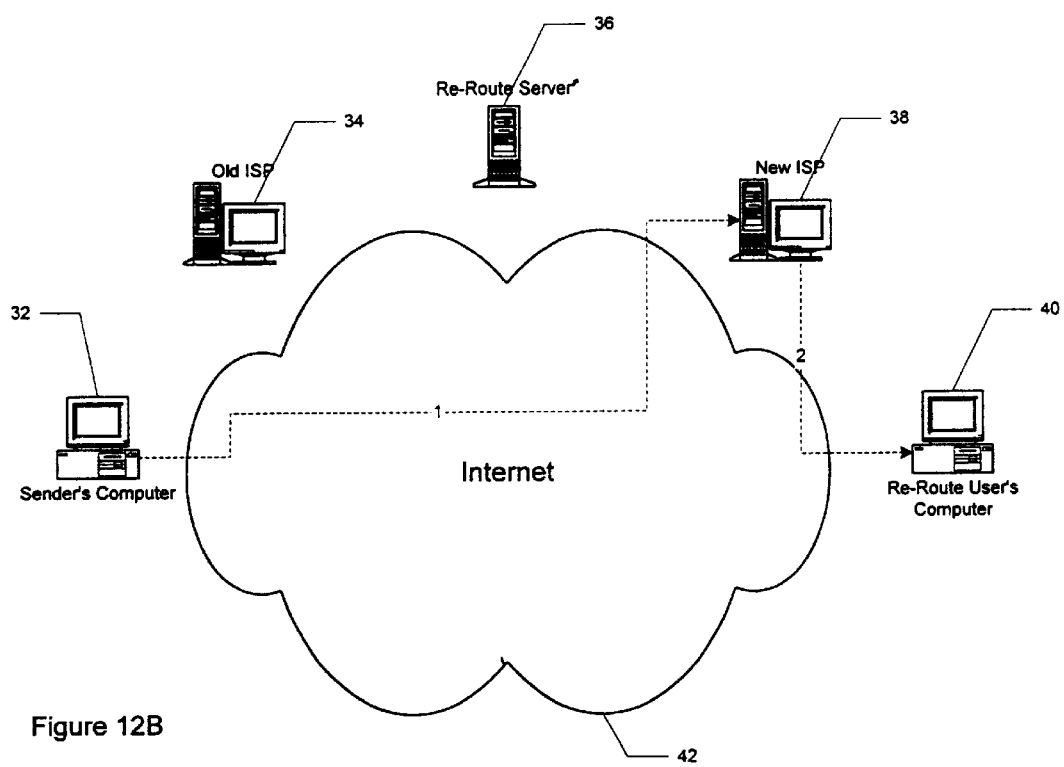
FIG. 12B illustrates the direct e-mail re-route path for the LDAP implementation of the present invention.

Referring to FIG. 12B, the direct e-mail re-route path is shown. This is fairly simple after the "to" file for the recipient is updated by the re-route server 36. Thereafter, the sending computer 32 has the appropriate address of the new ISP 38 and mail can be forwarded to the new ISP 38 over the Internet 42 to the recipient 40.

Figure 13:
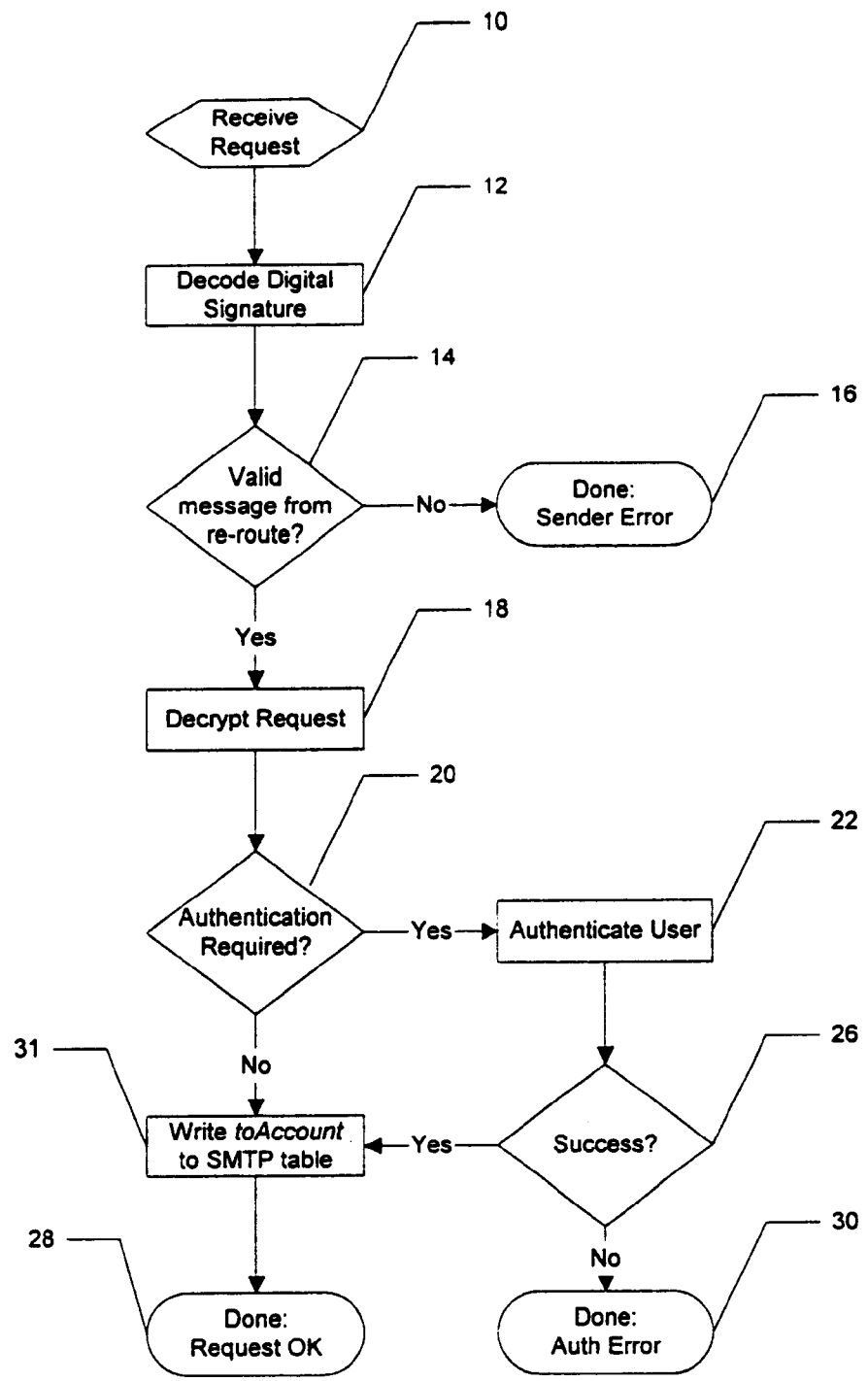
FIG. 13 illustrates request handler for the Return Code implementation of the present invention.

Referring to FIG. 13, a re-route request handler of yet another embodiment of the present invention is illustrated. This request handler operates in the same fashion as first noted in FIG. 1 (above). However, after the authentication procedures 20, 22, 26, the toAccount for the recipient is written to an SMTP table. This SMTP table 31 holds the new address for receiving e-mail.

Figure 13A:
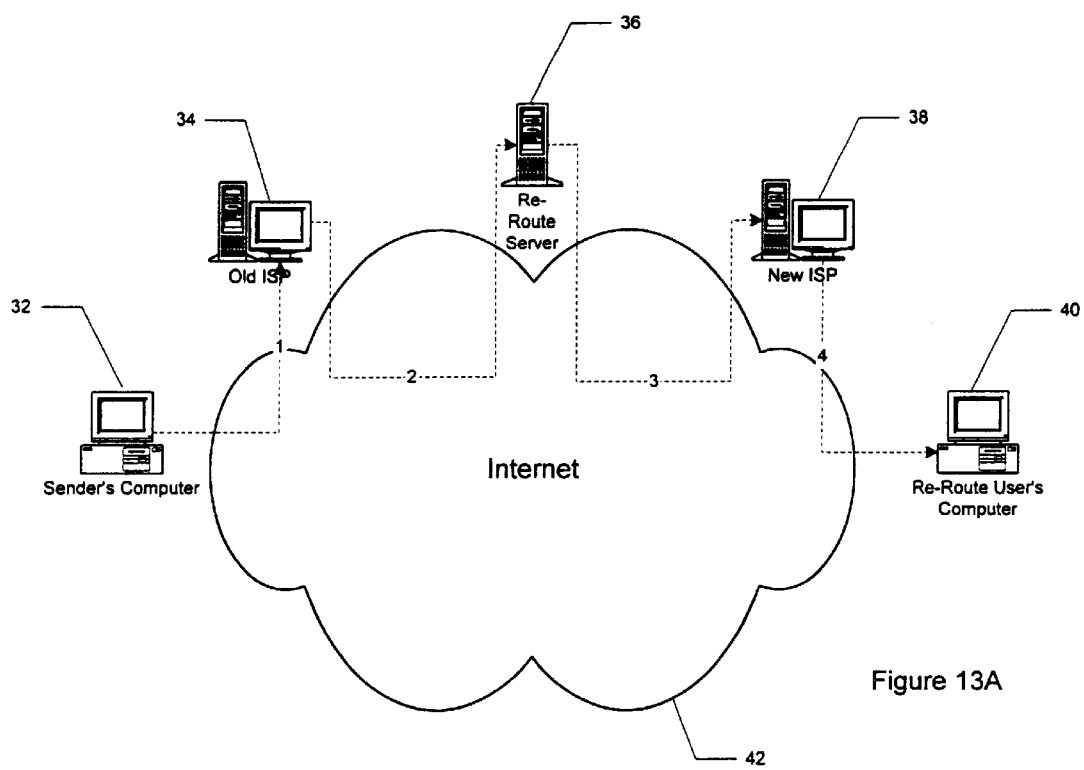
FIG. 13A illustrates the e-mail re-route path for the Return Code implementation of the present invention.

Referring to FIG. 13A, the e-mail re-route path is illustrated. Sending computer 32 sends an e-mail message to the recipient's last known e-mail address at the old ISP 34. The old ISP 34, recognizing that this recipient is no longer at the ISP, forwards the message to the re-route server. The re-route server receives the toAccount information for the recipient and matches it to the entry in the SMTP table stored at the re-route server 36. Thereafter, the message is re-addressed and sent to the new ISP 38 over the Internet 42 for delivery to the recipient 40.

Figure 13B:
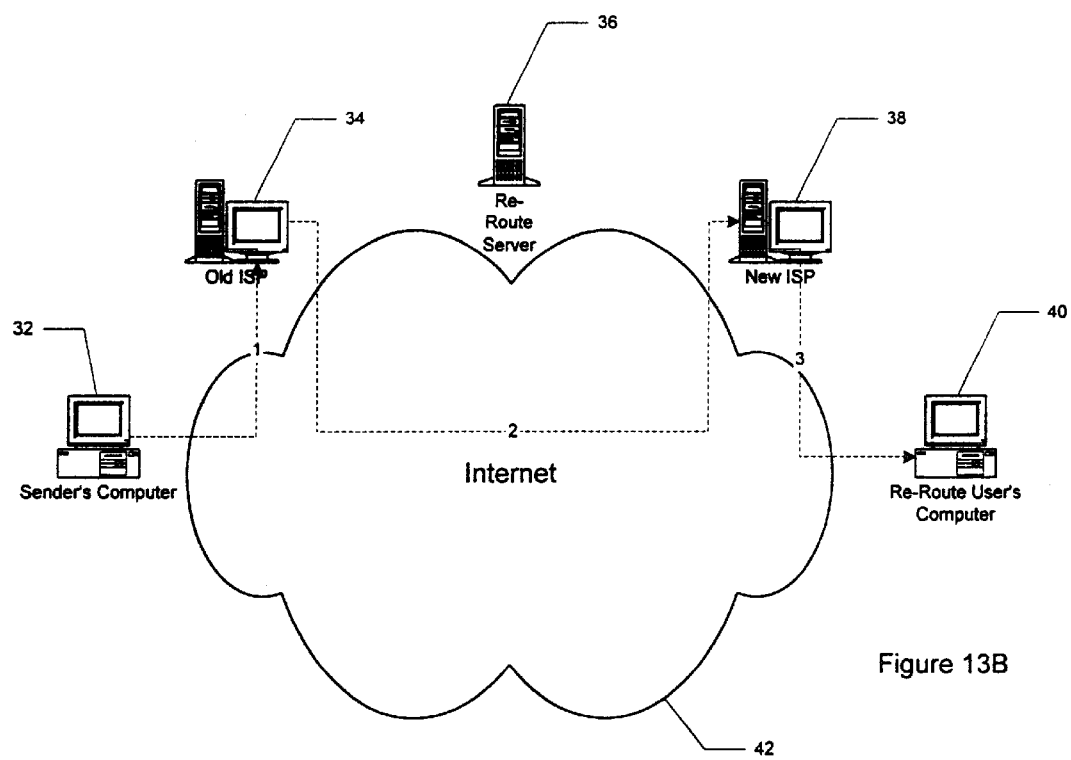
FIG. 13B illustrates the direct e-mail re-route path for the Return Code implementation of the present invention.

Referring to FIG. 13B, the e-mail re-route direct path is illustrated. In this instance, the old ISP 34 contains the SMTP table and associated address relating to the toAccount of the recipient. The sending computer 32 sends the e-mail address to the recipient's address at the old ISP 34. Old ISP 34 matches the toAccount information to the SMTP table and forwards the e-mail over the Internet 42 to the new ISP 38 for delivery to the recipient 40.

Figure 14:
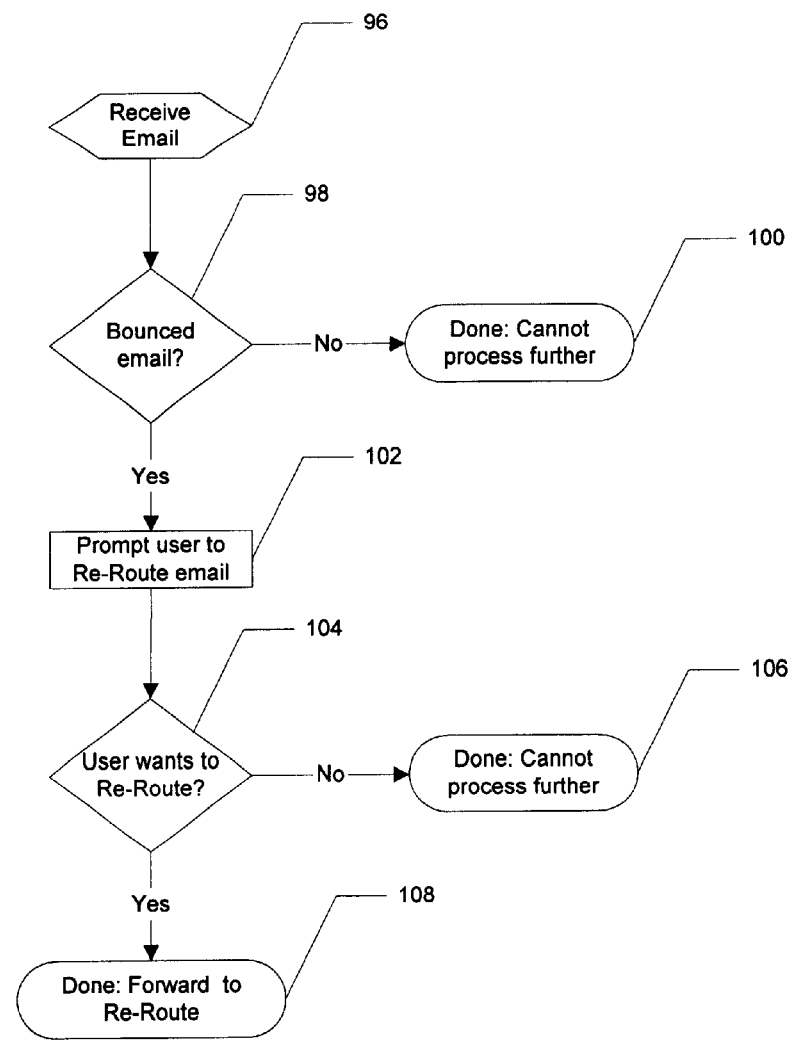
FIG. 14 illustrates the client plug in module implementation of the present invention.

Referring to FIG. 14, a client plug-in module for the re-routing of e-mail is illustrated. E-mail is received at the client 96. The e-mail is then reviewed to determine if it is bounced e-mail 98. If the e-mail is not bounced, the client plug-in performs no further processing 100. If the e-mail is bounced, the user is prompted to re-route the e-mail 102. The user then decides whether to re-route the e-mail 104, and if not, processing terminates 106. If the user wants to re-route the e-mail, the e-mail is forwarded to the re-route server 108.

Figure 14A:
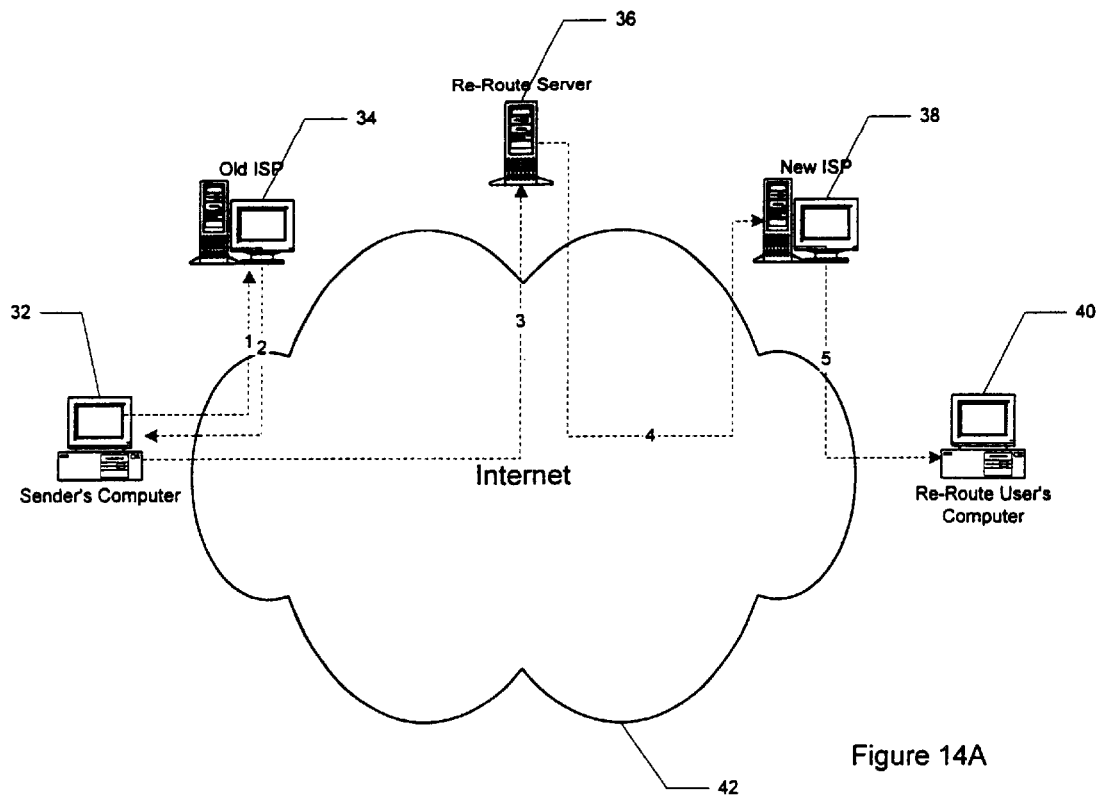
FIG. 14A illustrates the e-mail re-route paths for the client plug in module implementation of the present invention.

Referring to FIG. 14A, the e-mail re-route path is shown. Sending computer 32 sends an e-mail to the old ISP 34. Old ISP 34 notes that the recipient is no longer present and bounces the e-mail back to the sending computer 32. Sending computer 32 notes that the e-mail is bounced e-mail, and therefor forwards it to the re-route server 36. Re-route server 36, recognizing that the recipient is a re-route customer, forwards the e-mail to the new ISP 38 over the Internet 42 for delivery to the recipient 40.

Figure 14B:
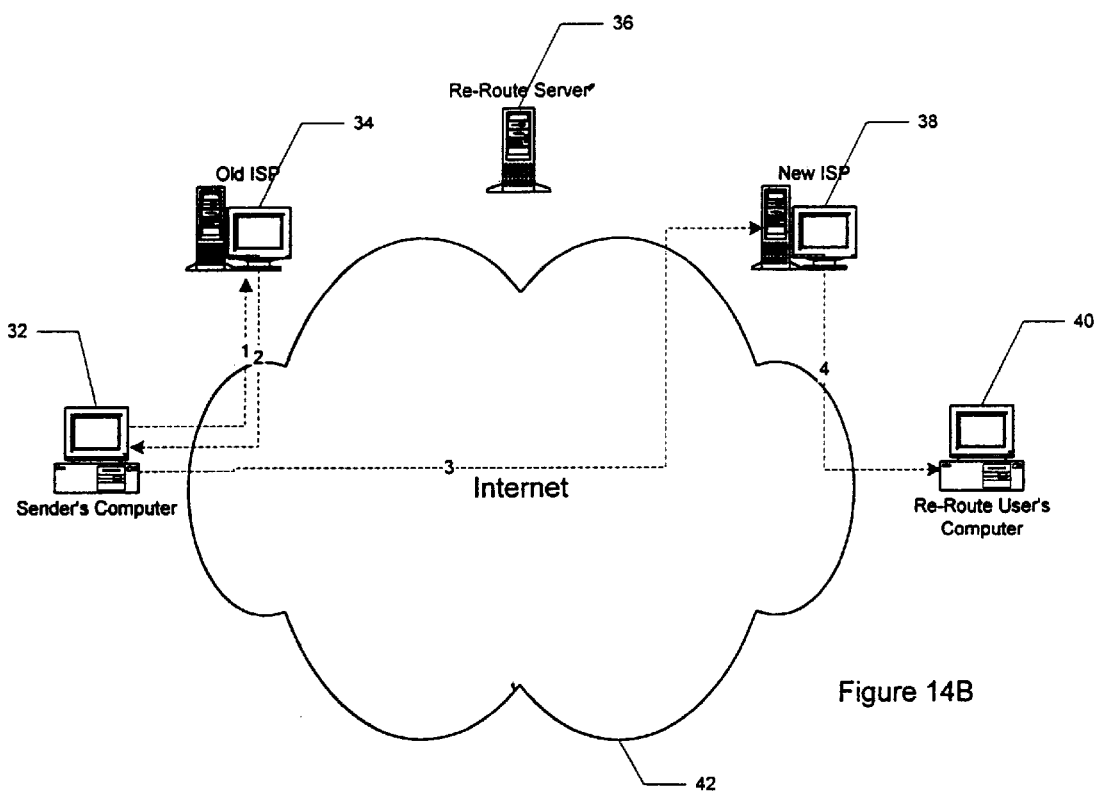
FIG. 14B illustrates the direct e-mail re-route paths for the client plug in module implementation of the present invention.

Referring to FIG. 14B, the e-mail re-route path that is more direct is shown. In this instance, sending computer 32 sends an e-mail to the old ISP address for the recipient 34. The old ISP bounces the e-mail back to the sending computer 32, having the new e-mail address via its plug-in module, then sends e-mail to the new ISP 38 over the Internet 42 for delivery to the recipient 40.

Figure 15:
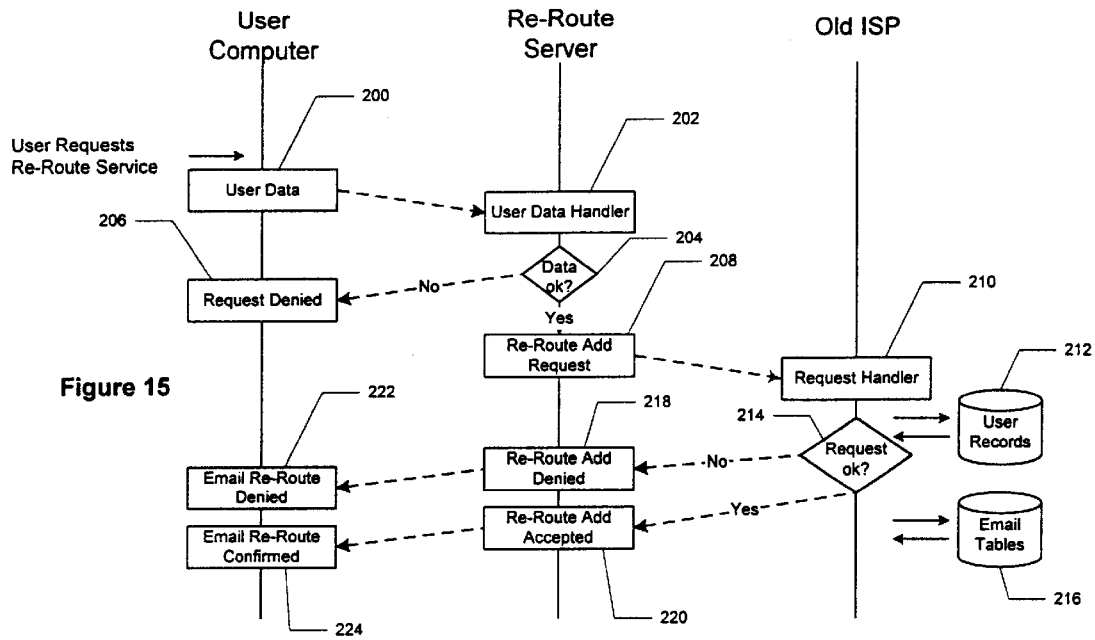
FIG. 15 illustrates a Re-route Add Request protocol according to the present invention.

Referring to FIG. 15, the Re-route Add Request flow is illustrated. A user creates the user data 200 that indicates the new e-mail address to which the user would like e-mail forwarded. The user data 200 may, alternatively, be created by the user's new ISP on the user's behalf This user data 200 is sent to the re-route server, which comprises software for receiving and processing user data 202.

The re-route server checks the user data 204 to insure that all necessary information is present to form the re-route request and to register the user with the re-route server. If the data is in any way deficient, the re-route request is denied and a message so indicating is sent 206 to the user's computer (or the user's new ISP, as the case may be). If the data is sufficient, a re-route request is formulated 208 and sent to the re-route request handling routine 210 at the old ISP.

Once a re-route request is receive at the old ISP from the re-route server, the old ISP checks to determine if the request has the necessary data 214 to be acted on by the old ISP. This involves the old ISP checking its own user records 212 to determine if the user is a subscriber to the old ISP, to update its subscriber records regarding the status of the user, as well as to update the e-mail tables 216 at the old ISP to reflect the action needed for e-mail destined for the user. Such action has been described in detail in a variety of embodiments (above).

If the request is satisfactory in all respects, the re-route request is accepted and an acceptance message 220 is sent to the re-route server, and the e-mail re-route request is confirmed to the user 224 (or the user's new ISP, as the case may be). If the data supplied to the old ISP is not satisfactory in all respects, a re-route denial message 218 is sent to the re-route server, and a "re-route denied" message 222 is sent to the user (or the user's new ISP, as the case may be).

Figure 16:
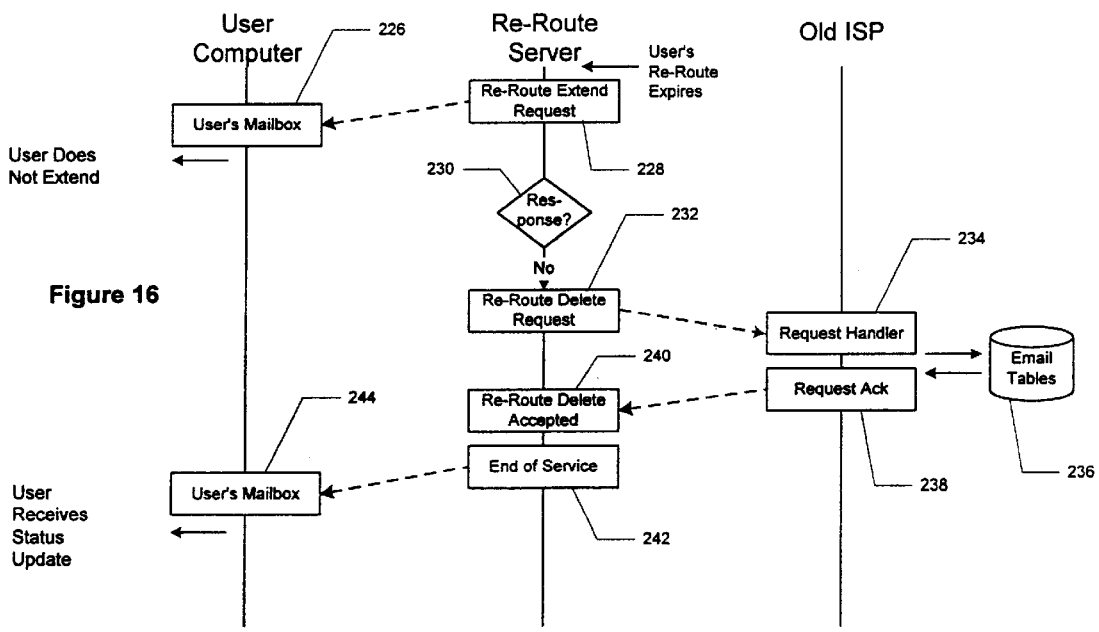
FIG. 16 illustrates a Re-route Delete Request protocol according to the present invention.

Referring to FIG. 16, the Re-route Delete Request flow is illustrated. Part of any reroute request of a user is a length of time for which the re-route request is to be in force. This may be set by the user or may be a standard amount of time set by the re-route server business rules. Once the time duration for the re-route request has expired, the re-route server generates an extension request 228 that is sent to the user's mailbox 226 or to the user's last known ISP. The system then waits for a user's response 230.

If there is no response from the user within a given amount of time, a re-route delete request 232 is automatically generated by the re-route server and forwarded to the request handler 234 of the old ISP. The old ISP then updates its e-mail tables 236 by deleting the forwarding address for the user.

After updating its e-mail tables 236, the old ISP sends an acknowledgment message 238 to the re-route server. The re-route server accepts the message 240, ends its re-route service for the user 242, and forwards a message so indicating to the user's mailbox 244 at the user's computer (or the user's ISP, as the case may be).

Figure 17:
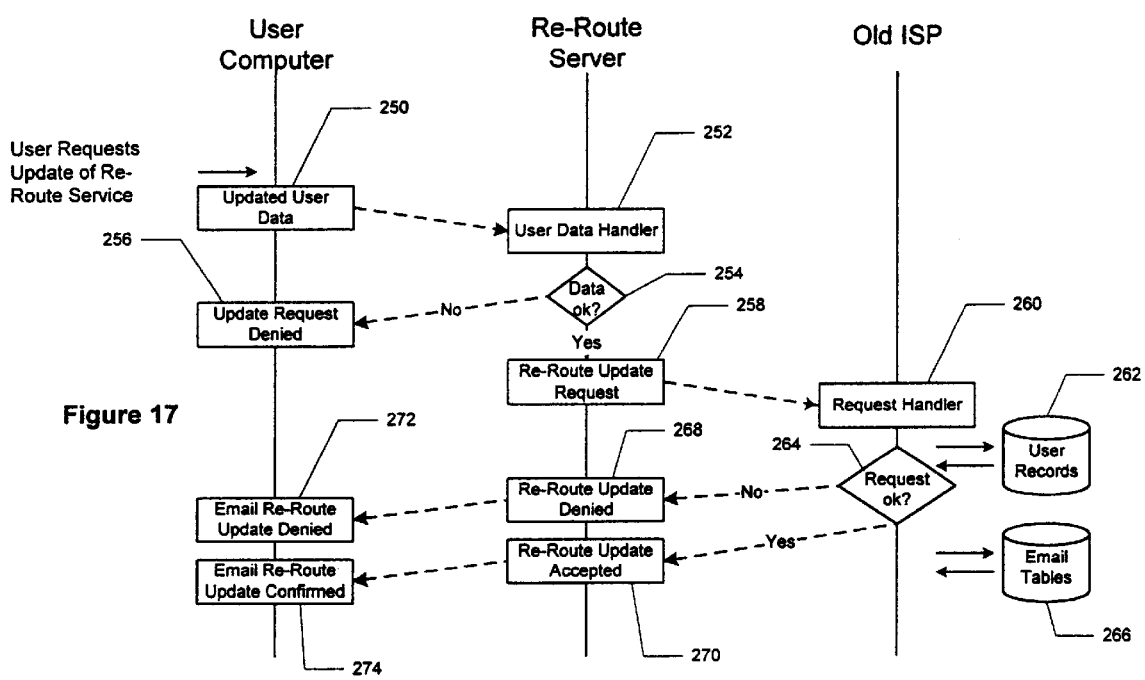
FIG. 17 illustrates a Re-route Edit Request protocol according to the present invention.

Referring to FIG. 17, the Re-route Update Request flow is illustrated. A user creates the updated user data 250 that indicates the updated e-mail address to which the user would like e-mail forwarded. The updated user data 250 may, alternatively, be created by the user's new ISP on the user's behalf. This updated user data 250 is sent to the re-route server, which comprises software for receiving and processing updated user data 252.

The re-route server checks the updated user data 254 to insure that all necessary information is present to form the re-route update request and to register the user's updated data with the re-route server. If the data is in any way deficient, the re-route update request is denied and a message so indicating is sent 256 to the user computer (or the user's new ISP, as the case may be). If the updated data is sufficient, a re-route update request is formulated 258 and sent to the re-route update request handling routine 260 at the old ISP.

Once a re-route update request is received at the old ISP from the re-route server, the old ISP checks to determine if the re-route update request has the necessary data 264 to be acted on by the old ISP. This involves the old ISP checking its own user records 262 to determine if the user was (or is) a subscriber to the old ISP, to update its subscriber records regarding the status of the user, as well as to update the e-mail tables 266 at the old ISP.

If the request is satisfactory in all respects, the re-route update request is accepted and an acceptance message 270 is sent to the re-route server, and the e-mail re-route update request is confirmed to the user 274 (or the user's new ISP, as the case may be). If the updated data supplied to the old ISP is not satisfactory in all respects, a re-route update denial message 268 is sent to the re-route server, and a "re-route update denied" message 272 is sent to the user (or the user's new ISP, as the case may be).

The re-route server is implemented as follows. The e-mail re-route server receives e-mails from the Internet and re-routes them according to the rules described above. The e-mail server is based on known, robust, Internet e-mail server architectures. Preferably, the re-route server is one or more Unix-based machines running the sendmail mail software. In addition to typical e-mail processing, the re-route server's mail software performs additional, optional operations. These additional operations include:

interfacing to the re-route subscriber database/tables to query information on subscriber preferences (status, spam filtering, sender notification, virus checking, etc.)

interfacing to the re-route subscriber database/tables to insert information about current events (e-mail status, sender, date, etc.). This information will be used for billing and report generation.

Additional e-mail processing (spam filtering, virus checking, sender notification, etc.)

Hardware requirements depend on the number of customers, however as an example, a system that handles a moderate number of re-route subscribers includes a Sun server running the Solaris (Unix) operating system.

A database server holds information about each customer, and about the e-mails received by the mail re-route server. This information is used for billing and report generation. The database server is based on known, robust, database server architectures. Preferably, this server is a Unix-based machine running Oracle or MySQL database server software.

The present invention has been described in terms of a number of preferred embodiments. However, it will be understood by those of ordinary skill in the art that various modifications and improvements may be made to the invention as described, without departing from the scope of the invention. The scope of the invention is limited only by the appended claims.

We claim:

1. A method of re-routing e-mail comprising:
- a recipient registering a request to re-route the recipient's e-mail with a re-route server;
- the re-route server sending the re-route request to an old ISP;
- the old ISP receiving and processing the re-route request;
- the old ISP bouncing mail for the recipient to the re-route server when the recipient no longer has an e-mail address at the old ISP;
- the re-route server receiving the bounced e-mail for the recipient; and
- the re-route server forwarding the e-mail to a new address for the recipient.

2. The method of re-routing e-mail of claim 1, wherein the request to re-route the recipient's e-mail comprises an old address of the recipient at the old ISP and the new address to which the recipient wants the recipient's e-mail forwarded.

3. A method of re-routing e-mail comprising:
- registering, at a re-route server, a request from an e-mail recipient to re-route the recipient's e-mail;
- sending the re-route request from the re-route server to an old ISP;
- receiving at the re-route server e-mail for the recipient that was bounced by the old ISP when the recipient no longer has an email address at the old ISP; and
- forwarding the bounced e-mail to a new address for the recipient.

4. A method of re-routing e-mail comprising:
- receiving at an old ISP from a re-route server a re-route request by a recipient to re-route the recipient's e-mail;
- the old ISP processing the re-route request;
- the old ISP bouncing mail for the recipient to the re-route server when the recipient no longer has an e-mail address at the old ISP for forwarding on by the re-route server to a new address for the recipient.

5. The method for re-routing e-mail of claim 4, further comprising:
- the old ISP bouncing mail for the recipient to its sender when the recipient no longer has an e-mail address at the old ISP.

6. An apparatus for handling, through a network, an e-mail message addressed by a sender to an address at an old ISP, the apparatus comprising:
- a re-route server connected to the network, the re-route server comprising:
  - a processor; and
  - a memory, in addressable communication with the processor, the memory embodying software instructions adapted to enable the processor to perform:
    - registering a request from an e-mail recipient to re-route the recipient's e-mail,
    - sending the re-route request to an old ISP, and
    - receiving an e-mail message for the recipient bounced by the old ISP when the recipient no longer has an email address at the old ISP.

7. The apparatus for handling as claimed in claim 6, wherein the software instructions embodied in the memory are further adapted to enable the processor to perform:
- checking to determine if the bounced e-mail is for a recipient who is registered with the re-route server; and
- forwarding the bounced e-mail message to a new address for the recipient, in the event it is determined that the bounced e-mail is for a recipient who is registered with the re-route server.

8. The apparatus for handling as claimed in claim 6, wherein the e-mail message for the recipient bounced by the old ISP is also bounced by the old ISP to the sender.

* * * * *